US008304950B2

(12) United States Patent
Yoshizawa et al.

(10) Patent No.: US 8,304,950 B2
(45) Date of Patent: Nov. 6, 2012

(54) DYNAMOELECTRIC MACHINE

(75) Inventors: Toshiyuki Yoshizawa, Tokyo (JP); Masaya Inoue, Tokyo (JP); Kanji Shinkawa, Tokyo (JP); Masao Morita, Tokyo (JP); Moriyuki Hazeyama, Tokyo (JP); Takeshi Mori, Tokyo (JP); Hiroyuki Akita, Tokyo (JP); Ryuichi Shimomura, Tokyo (JP); Kazunori Tanaka, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 169 days.

(21) Appl. No.: 12/812,844

(22) PCT Filed: Apr. 28, 2008

(86) PCT No.: PCT/JP2008/058191

§ 371 (c)(1), (2), (4) Date: Jul. 14, 2010

(87) PCT Pub. No.: WO2009/101710

PCT Pub. Date: Aug. 20, 2009

(65) Prior Publication Data

US 2011/0043068 A1 Feb. 24, 2011

(30) Foreign Application Priority Data

Feb. 13, 2008 (JP) ................................ 2008-031647
Feb. 13, 2008 (JP) ................................ 2008-031656

(51) Int. Cl.
*H02K 21/14* (2006.01)
*H02K 1/22* (2006.01)

(52) U.S. Cl. ............... 310/156.72; 310/156.66; 310/263

(58) Field of Classification Search ............ 310/156.72, 310/156.73, 263, 156.66
See application file for complete search history.

(56) References Cited

U.S. PATENT DOCUMENTS

| | | | |
|---|---|---|---|
| 5,543,676 | A | 8/1996 | York et al. |
| 5,825,116 | A | 10/1998 | Ishikawa |
| 6,144,138 | A | 11/2000 | Ragaly |

(Continued)

FOREIGN PATENT DOCUMENTS

EP 0 837 538 A1 4/1998

(Continued)

OTHER PUBLICATIONS

U.S. Appl. No. 13/058,875, filed Feb. 14, 2011, Mori, et al.

(Continued)

*Primary Examiner* — Burton Mullins

(74) *Attorney, Agent, or Firm* — Oblon, Spivak, McClelland, Maier & Neustadt, L.L.P.

(57) ABSTRACT

A dynamoelectric machine that can suppress increases in rotor inertia to extend belt service life and increase field magnetomotive force to increase output. In the dynamoelectric machine, first and second magnetic guidance members are fitted into first and second holding grooves that are disposed so as to extend axially on facing portions of first and second trough portions radially outside inner wall surfaces, and are disposed so as to span over first and second trough portions. First and second permanent magnets that are magnetically oriented in a reverse direction to a magnetic field that originates from a field coil are fitted into and held by interfitting grooves of the first and second magnetic guidance members so as to face inner circumferential surfaces near tip ends of second and first claw-shaped magnetic pole portions so as to have a predetermined clearance.

12 Claims, 16 Drawing Sheets

U.S. PATENT DOCUMENTS

| | | | | |
|---|---|---|---|---|
| 6,747,384 | B2 * | 6/2004 | Militello et al. | 310/156.08 |
| 7,560,851 | B2 | 7/2009 | Inoue et al. | |
| 7,589,449 | B2 * | 9/2009 | Kitamura | 310/263 |
| 7,605,519 | B2 | 10/2009 | Morita et al. | |
| 7,656,069 | B2 | 2/2010 | Shinkawa et al. | |
| 8,148,864 | B2 * | 4/2012 | Yoshizawa et al. | 310/156.12 |
| 2002/0005673 | A1 | 1/2002 | Umeda et al. | |
| 2003/0137212 | A1 | 7/2003 | Militello et al. | |
| 2010/0096941 | A1 | 4/2010 | Inoue et al. | |
| 2010/0164317 | A1 | 7/2010 | Inoue et al. | |
| 2010/0207476 | A1 | 8/2010 | Yoshizawa et al. | |
| 2011/0001383 | A1 * | 1/2011 | Shimomura et al. | 310/181 |
| 2011/0181142 | A1 * | 7/2011 | Yoshizawa et al. | 310/156.12 |

FOREIGN PATENT DOCUMENTS

| | | |
|---|---|---|
| JP | 9 131030 | 5/1997 |
| JP | 10 136623 | 5/1998 |
| JP | 2003 244875 | 8/2003 |

OTHER PUBLICATIONS

U.S. Appl. No. 13/122,611, filed Apr. 5, 2011, Yoshizawa, et al.

U.S. Appl. No. 12/921,319, filed Sep. 7, 2010, Inoue, et al.

U.S. Appl. No. 12/920,954, filed Sep. 3, 2010, Hazeyama, et al.

Extended European Search Report issued Aug. 1, 2011, in Patent Application No. 08740910.8.

* cited by examiner

Comparative Example 32
30A
32
30A
31A

DYNAMOELECTRIC MACHINE

TECHNICAL FIELD

The present invention relates to a dynamoelectric machine such as an automotive alternator, etc., and particularly relates to a Lundell rotor.

BACKGROUND ART

Automotive alternators that use Lundell rotors have been used in automobiles for decades. Loads from electrical equipment that is mounted due to environmental issues have been increasing rapidly in recent years, and further increases in generated power are being sought from Lundell rotors.

Increasing field magnetomotive force of the rotor is most effective for increasing output of Lundell dynamoelectric machines. However, if the amount of magnetic flux that passes through the rotor is increased by increasing the field magnetomotive force, sizes of respective portions of the rotor are consequently required to be designed such that appropriate magnetic flux density is achieved so as to avoid magnetic saturation of rotor magnetic path portions. From a design perspective, it is necessary to ensure that yoke portions are not magnetically saturated from root portions of claw-shaped magnetic pole portions.

In magnetic path design of a Lundell rotor, methods have been proposed in which design is performed such that magnetic path cross-sectional area of a yoke portion is sufficiently large relative to root magnetic path cross-sectional area of claw-shaped magnetic pole portions as a design that alleviates magnetic saturation of the rotor (see Patent Literature 1, for example).

Patent Literature 1

Japanese Patent Laid-Open No. HEI 11-243673 (Gazette)

DISCLOSURE OF THE INVENTION

Problem to be Solved by the Invention

However, in the above conventional Lundell rotor, axial thickness of the yoke portion is increased significantly as a result of having designed the magnetic flux density of the respective portions appropriately, increasing rotor inertia significantly.

In automotive alternators, engine power is transmitted through a belt and pulley. For this reason, if rotor inertia is increased, when there is engine rotational pulsation, etc., inertia torque of the rotor is increased, and one problem is that driving torque transmitting capacity of the belt may be exceeded, giving rise to belt slippage, and shortening belt service life.

The present invention aims to solve the above problems and an object of the present invention is to provide a dynamoelectric machine that can suppress increases in rotor inertia to extend belt service life and increase field magnetomotive force to increase output by disposing a permanent magnet that generates magnetic flux to cancel out magnetic flux that originates from a field coil to alleviate magnetic saturation of rotor magnetic path portions, and reducing thickness beyond conventional design limits of a yoke portion that contributes to rotor inertia.

Means for Solving the Problem

In order to achieve the above object, according to one aspect of the present invention, there is provided a dynamoelectric machine including: a rotor including: a pole core including: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, a trough portion that curves radially inward being formed on a portion of each of the yoke portions between circumferentially adjacent claw-shaped magnetic pole portions, and the pole core being prepared such that tip end portions of the claw-shaped magnetic pole portions overlap with the yoke portions axially, and being fixed to a rotating shaft that is inserted through a central axial position of the boss portion; and a field coil that is housed inside a space that is surrounded by the boss portion, the pair of yoke portions, and the plurality of claw-shaped magnetic pole portions; and a stator that is disposed so as to surround an outer circumference of the rotor so as to have a predetermined air gap interposed. The dynamoelectric machine includes: a magnetic guidance member that is made of a magnetic material and is disposed so as to span the trough portion; and a permanent magnet that is disposed on the magnetic guidance member so as to face an inner circumferential surface near a tip end of the claw-shaped magnetic pole portions so as to have a predetermined clearance, and that is magnetically oriented in a reverse direction to an orientation of a magnetic field produced by the field coil.

Effects of the Invention

According to the present invention, magnetic guidance members are disposed so as to span trough portions, and permanent magnets are disposed on the magnetic guidance members so as to face inner circumferential surfaces near tip ends of claw-shaped magnetic pole portions so as to have a predetermined clearance, and are magnetically oriented in a reverse direction to a direction of a magnetic field that is produced by a field coil. In permanent magnets that are disposed at a first axial end, magnetic flux that originates from the permanent magnets flows through the inner circumferential surfaces near the tip ends of the facing claw-shaped magnetic pole portions from outer circumferential surfaces of the permanent magnets. On the other hand, in permanent magnets that are disposed at a second axial end, magnetic flux that originates from the permanent magnets is diverted circumferentially from inner circumferential surfaces of the permanent magnets and guided toward a yoke portion by the magnetic guidance members, and subsequently guided to a central portion of a pole core by the yoke portion.

Thus, because magnetic flux that originates from the permanent magnets flows through a closed magnetic circuit inside the rotor in a reverse direction to the magnetic flux that is generated by the passage of electric current to the field coil, magnetic saturation of the rotor is alleviated. In addition, the magnetic flux that is guided from the permanent magnets to the yoke portion by the magnetic guidance members flows in a reverse direction to the magnetic flux that originates from the field coil that flows through the yoke portion from the central portion of the pole core to the portions near the root ends of the claw-shaped magnetic pole portions, and acts to alleviate magnetic saturation of the yoke portion. As a result, even if field magnetomotive force increases and the amount of magnetic flux increases, the yoke portion is less likely to become magnetically saturated, enabling thickness of the yoke portion to be reduced beyond conventional design concepts, and rotor inertia is reduced, eliminating the need to adopt countermeasures against belt slippage on a clutch pulley, etc., due to rotational inertia torque. In addition, field magnetomotive force can be increased, enabling increased output.

BEST MODE FOR CARRYING OUT THE INVENTION

Embodiment 1

Figure 1:
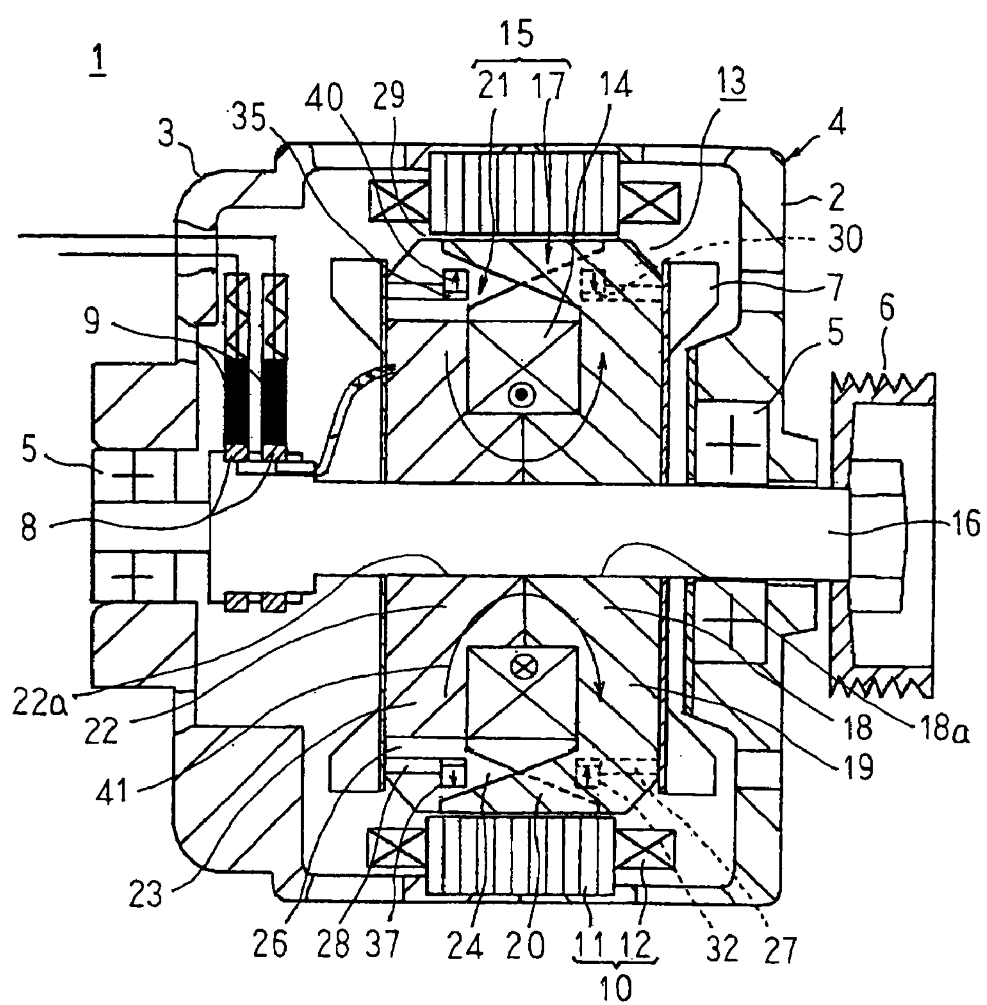
FIG. 1 is a cross section that schematically shows an automotive alternator according to Embodiment 1 of the present invention.
Figure 2:
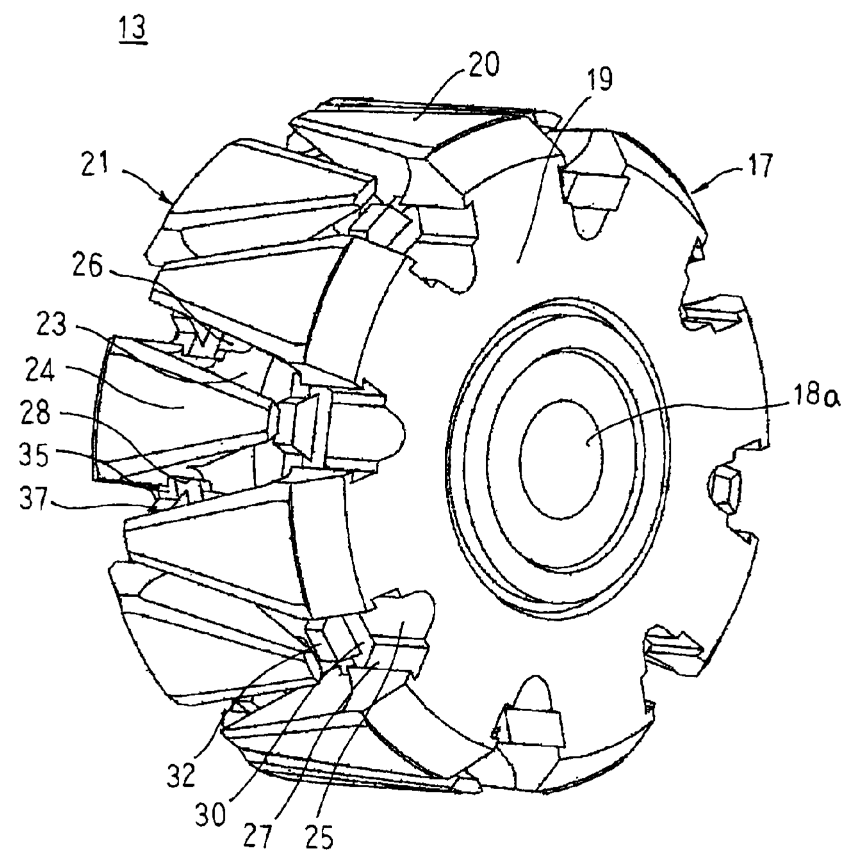
FIG. 2 is a perspective that shows a rotor that can be used in the automotive alternator according to Embodiment 1 of the present invention.
Figure 3:
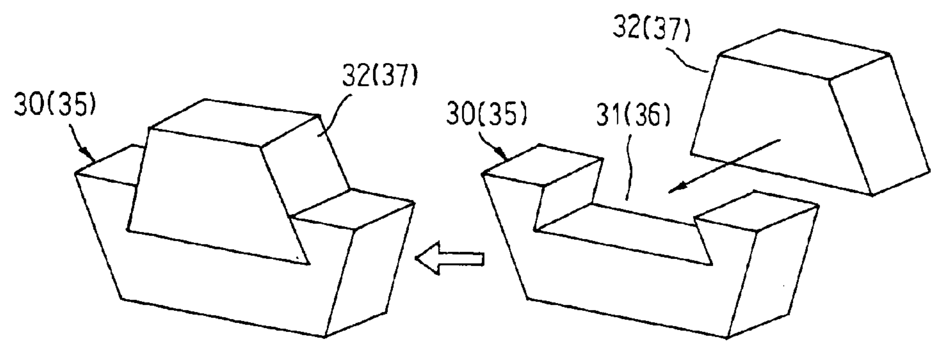
FIG. 3 is a perspective that explains a method for mounting a permanent magnet to a magnetic guidance member in the automotive alternator according to Embodiment 1 of the present invention.

FIG. 1 is a cross section that schematically shows an automotive alternator according to Embodiment 1 of the present invention, FIG. 2 is a perspective that shows a rotor that can be used in the automotive alternator according to Embodiment 1 of the present invention, and FIG. 3 is a perspective that explains a method for mounting a permanent magnet to a magnetic guidance member in the automotive alternator according to Embodiment 1 of the present invention.

In FIGS. 1 through 3, an automotive alternator 1 includes: a case 4 that is constituted by a front bracket 2 and a rear bracket 3 that are each made of aluminum in an approximate cup shape; a rotor 13 that is rotatably disposed inside the case 4 such that a rotating shaft 16 is supported by means of bearings 5 in the case 4; a pulley 6 that is fixed to an end portion of the rotating shaft 16 that projects outward at a front end of the case 4; fans 7 that are fixed to two end surfaces in an axial direction of the rotor 13 (hereinafter "axial direction"); a stator 10 that is fixed to the case 4 so as to surround an outer circumference of the rotor 13 so as to have a constant air gap 29 relative to the rotor 13; a pair of slip rings 8 that are fixed to a rear end of the rotating shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the rotating shaft 16, which is fitted through a central axial position of the pole core 15.

The pole core 15 is configured so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and in which a rotating shaft insertion aperture **18*a* is formed so as to pass through a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially. In addition, first trough portions 25 are recessed so as to have U shapes that curve concavely toward a radially-inner side, for example, at portions that are positioned between respective adjacent first claw-shaped magnetic pole portions 20 of the first yoke portion 19**.

The second pole core body 21 has: a second boss portion 22 that has an outer circumferential surface that has a cylindrical shape, and in which a rotating shaft insertion aperture **22*a* is formed so as to pass through a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially. In addition, second trough portions 26 are recessed so as to have U shapes that curve concavely toward a radially-inner side, for example, at portions that are positioned between respective adjacent second claw-shaped magnetic pole portions 24 of the second yoke portion 23**.

First and second pole core bodies 17 and 21 that are configured in this manner are fixed to the rotating shaft 16 that has been fitted through the rotating shaft insertion apertures **18*a* and 22*a* such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15. Furthermore, tip end portions of the first and second claw-shaped magnetic pole portions 20 and 24 overlap with the second and first yoke portions 23 and 19**, respectively, in the axial direction.

First magnetic guidance members 30 are prepared so as to have trapezoidal cross sections that have a predetermined thickness using a magnetic material such as iron, or a ferromagnetic alloy, etc., and interfitting grooves 31 are recessed into upper surfaces so as to have openings. Here, upper and lower surfaces of the first magnetic guidance members 30 and bottom surfaces of the interfitting grooves 31 are parallel flat surfaces. The first interfitting grooves 31 are formed so as to have wedge shapes in which groove width become gradually narrower toward the openings. First permanent magnets 32 are prepared so as to have an external shape that conforms to an internal shape of the first interfitting grooves 31, that is, so as to have trapezoidal cross sections in planes that are perpendicular to a thickness direction, and so as to have thicknesses that are similar to those of the first magnetic guidance members 30, and upper and lower surfaces (an outer circumferential surface and an inner circumferential surface) of the first permanent magnets 32 are parallel flat surfaces. The first permanent magnets 32 are fitted into the first interfitting grooves 31 such their thickness directions are oriented in the thickness direction of the first magnetic guidance members 30, and first end surfaces of the first permanent magnets 32 and first end surfaces of the first magnetic guidance members 30 are positioned in a common plane, and are held in the first magnetic guidance member 30 by applying an adhesive if required. Thus, the bottom surfaces of the first interfitting grooves 31 and the lower surfaces of the first permanent magnets 32 face each other in close contact or so as to have minute gaps, and the first magnetic guidance members 30 and the first permanent magnets 32 are connected magnetically.

Second magnetic guidance members 35 are prepared into identical shapes as the first magnetic guidance members 30 using an identical material. Second permanent magnets 37 are prepared into identical shapes as the first permanent magnets 32 using an identical material. The second permanent magnets 37 are fitted into the second interfitting grooves 36 such their thickness directions is oriented in the thickness direction of the second magnetic guidance members 35, and first end surfaces of the second permanent magnets 37 and first end surfaces of the second magnetic guidance members 35 are positioned in a common plane, and are held in the second magnetic guidance members 35 by applying an adhesive if required. Thus, the bottom surfaces of the second interfitting grooves 36 and the lower surfaces of the second permanent magnets 37 face each other in close contact or so as to have minute gaps, and the second magnetic guidance members 35 and the second permanent magnets 37 are connected magnetically to the second magnetic guidance members 35.

First holding grooves 27 are recessed so as to pass through from a first end portion to a second end portion of the first yoke portion 19 near roots of respective first claw-shaped magnetic pole portions 20 of the first pole core body 17 so as to have openings at respective facing portions radially outside inner walls surfaces of the respective first trough portions 25 and so as to have groove directions in the axial direction. Similarly, second holding grooves 28 are recessed so as to pass through from a first end portion to a second end portion of the second yoke portion 23 near roots of respective second claw-shaped magnetic pole portions 24 of the second pole core body 21 so as to have openings at respective facing portions radially outside inner walls surfaces of the respective second trough portions 26 and so as to have groove directions in the axial direction. Here, the first and second holding grooves 27 and 28 are formed by broaching, or end milling, etc., so as to have groove shapes into which the first and second magnetic guidance members 30 and 35 can be fitted.

The first magnetic guidance members 30 are mounted to the first pole core body 17 by being press-fitted into the facing first holding grooves 27 from axially outside, for example, with the first permanent magnets 32 oriented upward so as to be magnetically connected when disposed so as to span each of the first trough portions 25, adhesive being applied if required. At that point, the thickness directions of the first magnetic guidance members 30 and the first permanent magnets 32 are oriented in the axial direction. When viewed from a radial direction, the first permanent magnets 32 are positioned entirely in an inside diameter portion of the second claw-shaped magnetic pole portions 24. The upper surfaces of the first permanent magnets 32 face inner circumferential surfaces near the tip ends of the second claw-shaped magnetic pole portions 24 so as to leave a predetermined clearance.

Similarly, the second magnetic guidance members 35 are mounted to the second pole core body 21 by being press-fitted into the facing second holding grooves 28 from axially outside, for example, with the second permanent magnets 37 oriented upward so as to be magnetically connected when disposed so as to span each of the second trough portions 26, adhesive being applied if required. At that point, the thickness directions of the second magnetic guidance members 35 and the second permanent magnets 37 are oriented in the axial direction. When viewed from a radial direction, the second permanent magnets 37 are positioned entirely in an inside diameter portion of the first claw-shaped magnetic pole portions 20. The upper surfaces of the second permanent magnets 37 face inner circumferential surfaces near the tip ends of the first claw-shaped magnetic pole portions 20 so as to leave a predetermined clearance.

The first and second permanent magnets 32 and 37 are magnetically oriented in directions of magnetization 40 that are opposite to the orientation of a magnetic field 41 that the field current that flows through the field coil 14 produces in a plane that is perpendicular to a central axis of the rotor 13. In other words, if the magnetic field 41 is generated in the direction of the arrow shown in FIG. 1 when an electric current is passed through the field coil 14, the first and second permanent magnets 32 and 37 are magnetically oriented in a reverse direction to the magnetic field 41. Here, the directions of magnetization 40 of the first and second permanent magnets 32 and 37 may be oriented radially, and extensions of the directions of magnetization 40 are directed at inner circumferential surfaces near the tip ends of the facing first and second claw-shaped magnetic pole portions 20 and 24. Moreover, in the case of a design in which the orientation of the magnetic field 41 that the field current that flows through the field coil 14 produces is inverted, the first and second permanent magnets 32 and 37 will also be magnetically oriented in a reverse direction.

Next, action of an automotive alternator 1 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Figure 4:
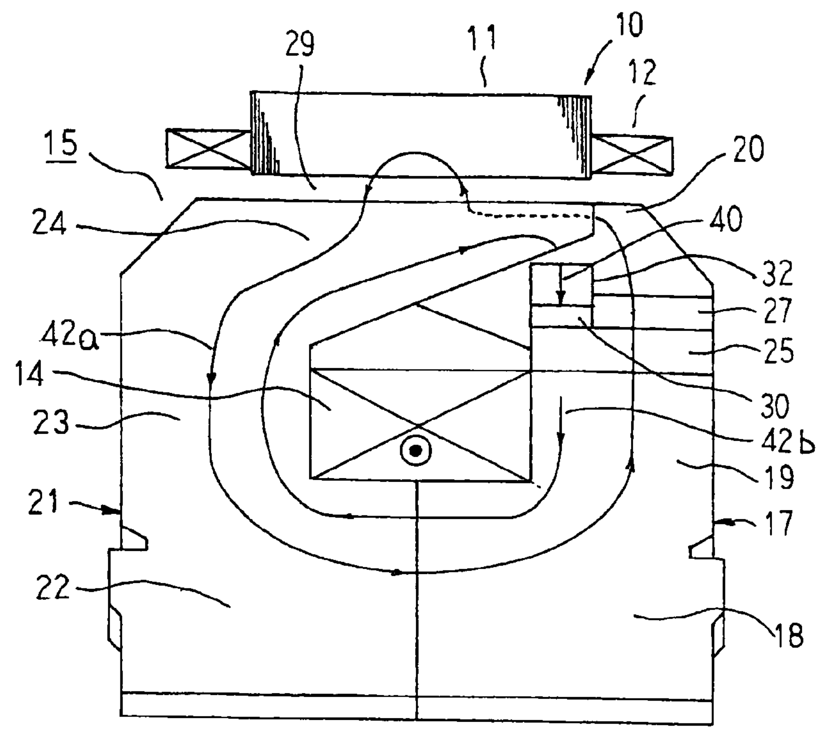
FIG. 4 is a schematic diagram for explaining flow of magnetic flux in the automotive alternator according to Embodiment 1 of the present invention.
Figure 5:
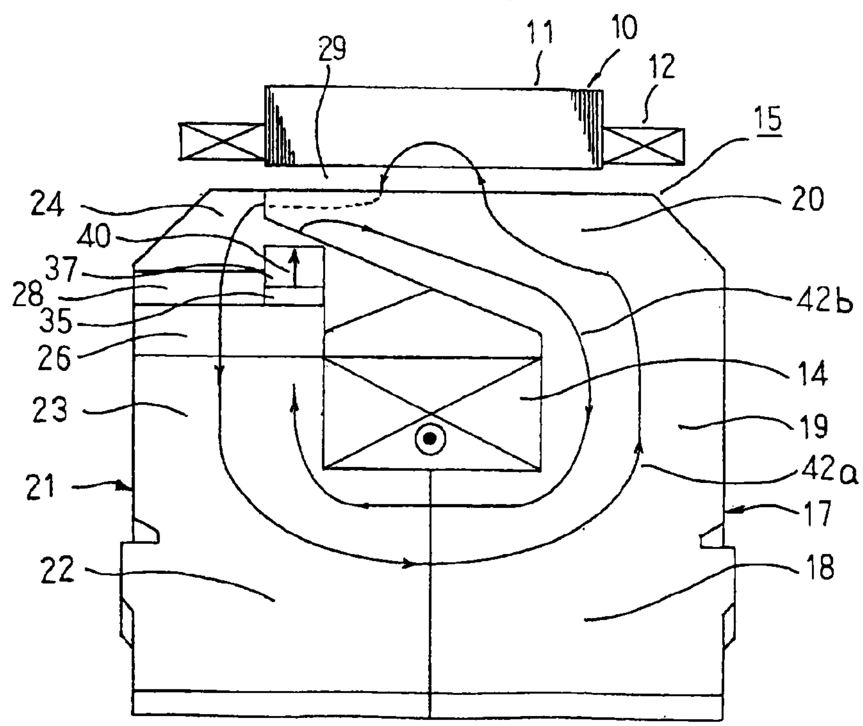
FIG. 5 is a schematic diagram for explaining flow of magnetic flux in the automotive alternator according to Embodiment 1 of the present invention.

Next, action of the magnetic flux will be explained with reference to FIGS. 4 and 5.

First, magnetic flux 42*a* is generated when an electric current is passed through the field coil 14. This magnetic flux 42*a* enters tooth portions of the stator core 11 by passing through the air gap 29 from the first claw-shaped magnetic pole portions 20. The magnetic flux 42*a* then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux 42*a* that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 1, the first and second permanent magnets 32 and 37 are magnetically oriented so as to be opposite to the orientation of the magnetic field 41 that is generated by the field coil 14. Thus, the orientation of the magnetic field that originates from the first and second permanent magnets 32 and 37 is in a reverse direction to the magnetic field 41 that is generated by the field coil 14. To interlink with the stator core 11, it is necessary for the magnetic flux 42*b* that originates from these first and second permanent magnets 32 and 37 to make a round trip across the air gap 29, which has a large magnetic resistance. The first and second permanent magnets 32 and 37 are disposed radially inside the second and first claw-shaped magnetic pole portions 24 and 20, and are disposed so as to circuit in a shorter magnetic path length than the inner circumferential surface sides of the first and second claw-shaped magnetic pole portions 20 and 24. In addition, because the first and second permanent magnets 32 and 37 are positioned entirely in an inside diameter portion of the second and first claw-shaped magnetic pole portions 24 and 20 when viewed from a radial direction, the magnetic flux 42*b* that originates from the second permanent magnets 37, for example, is less likely to flow through the stator core 11. Thus, a large portion of the magnetic flux 42*b* forms a closed magnetic circuit inside the rotor without going around through the stator core 13.

Specifically, magnetic flux 42*b* that originates from the first permanent magnets 32 enters the first magnetic guidance members 30. Here, the first trough portions 25, i.e., large air gaps, are present below the first magnetic guidance members 30. Thus, the magnetic flux 42*b* that has entered the first magnetic guidance members 30 flows through the first magnetic guidance members 30 in two circumferential directions and enters the first yoke portion 19, passes through the first boss portion 18, the second boss portion 22, the second yoke portion 23, and the second claw-shaped magnetic pole portions 24, and returns to the first permanent magnets 32. The magnetic flux 42*b* that originates from the second permanent magnets 37 enters the first claw-shaped magnetic pole portions 20 across the air gap, passes through the first yoke portion 19, the first boss portion 18, and the second boss portion 22, and enters the second yoke portion 23. The magnetic flux 42*b* that has entered the second yoke portion 23 flows upward through two sides of the second trough portions 26 of the second yoke portion 23, enters the second magnetic guidance members 35 from two ends of the second magnetic guidance members 35, and returns to the second permanent magnets 37.

Thus, the magnetic flux 42*b* that originates from the first and second permanent magnets 32 and 37 is in a reverse direction to the magnetic flux 42*a* that originates from the field coil 14, enabling the magnetic flux density of the magnetic bodies that constitute the first and second pole core bodies 17 and 21 to be reduced significantly, thereby enabling magnetic saturation to be relieved.

Figure 6:
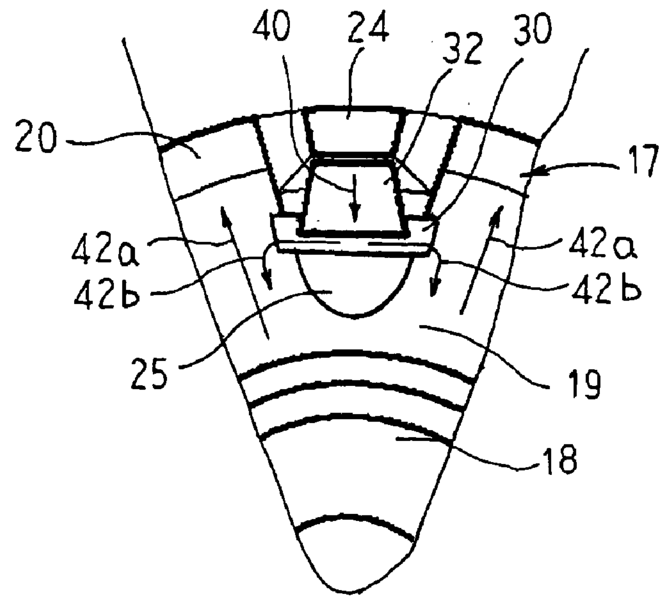
FIG. 6 is an end elevation that shows a vicinity of a first magnetic flux guidance member in the rotor that can be used in the automotive alternator according to Embodiment 1 of the present invention.

Next, actions and effects due to disposing the magnetic guidance members that support the permanent magnets so as to span the trough portions will be explained with reference to FIGS. 6 and 7. FIG. 6 is an enlarged end elevation that shows a vicinity of a magnetic flux guidance member of the rotor that is shown in FIG. 4, and FIG. 7 is an enlarged end elevation that shows a vicinity of a magnetic flux guidance member of a rotor that functions as a comparative example in which trough portions are embedded in a magnetic member.

In FIG. 6, the magnetic flux 42*a* that originates from the field coil 14 passes through the first boss portion 18 and the first yoke portion 19 and reaches the first claw-shaped magnetic pole portions 20. Now, if the magnetic path cross-sectional area of the first yoke portion 19 is smaller than the magnetic path cross-sectional area of the first boss portion 18, then the first yoke portion 19 becomes magnetically saturated, and the magnetic flux 42*a* that originates from the field coil 14 cannot be used effectively. Thus, in order to alleviate magnetic saturation in the first yoke portion 19, it is conceivable that the magnetic path cross-sectional area of the first yoke portion 19 could be made approximately equivalent to the magnetic path cross-sectional area of the first boss portion 18, as described in Patent Literature 1. However, in that case, rotor inertia is increased because axial dimensions of the rotor become large.

The magnetic flux 42*b* that originates from the first permanent magnets 32 enters the first magnetic guidance members 30, flows through the first magnetic guidance members 30 circumferentially, and is guided toward circumferential side surfaces of the first yoke portion 19. The magnetic flux 42*b* that is guided to the circumferential side surfaces of the first yoke portion 19 flows radially inward through the first yoke portion 19 along the first trough portions 25, and reaches the first boss portion 18. Here, the magnetic flux 42*b* flows through the first yoke portion 19 in a reverse direction to the magnetic flux 42*a*, alleviating magnetic saturation of the first yoke portion 19.

Figure 7:
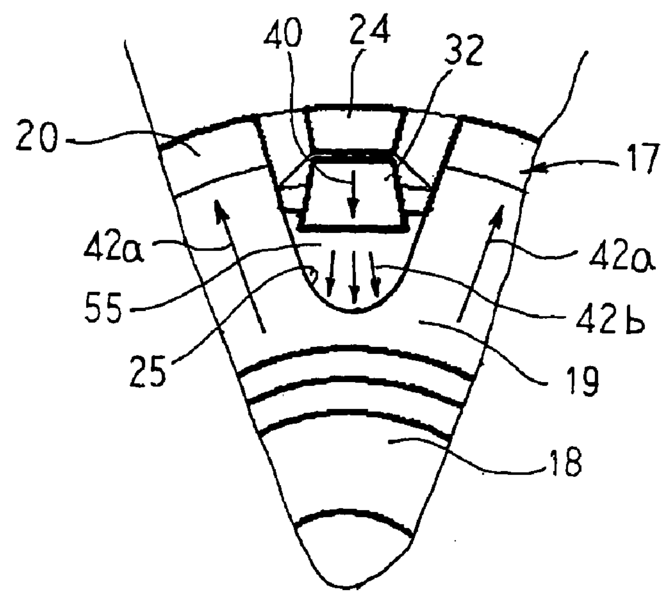
FIG. 7 is an end elevation that shows a vicinity of a first magnetic flux guidance member in a rotor that functions as a comparative example.

In FIG. 7, because the first permanent magnets 32 are magnetically oriented in a reverse direction to the direction of the magnetic field that is produced by the field coil 14, and the first trough portions 25 are filled by the magnetic members 55, the magnetic flux 42*b* that originates from the first permanent magnets 32 flows radially inward through the magnetic members 55, and flows through the first yoke portion 19 from bottom portions of the first trough portions 25. In other words, the magnetic flux 42*b* flows toward the first boss portion 18 without passing through the portions of the first yoke portion 19 on two circumferential sides of the first trough portions 25. Thus, alleviation of magnetic saturation in the first yoke portion 19 that results from the magnetic flux 42*a* flowing through the first yoke portion 19 is not performed, and in addition rotor inertia is also increased, making belt service life deteriorate.

Thus, by adopting the present configuration, effects such as enabling magnetic saturation to be relieved can be achieved by enabling the magnetic flux density of the magnetic bodies that constitute the first and second pole core bodies 17 and 21 to be reduced significantly while suppressing increases in rotor inertia.

Figure 8:
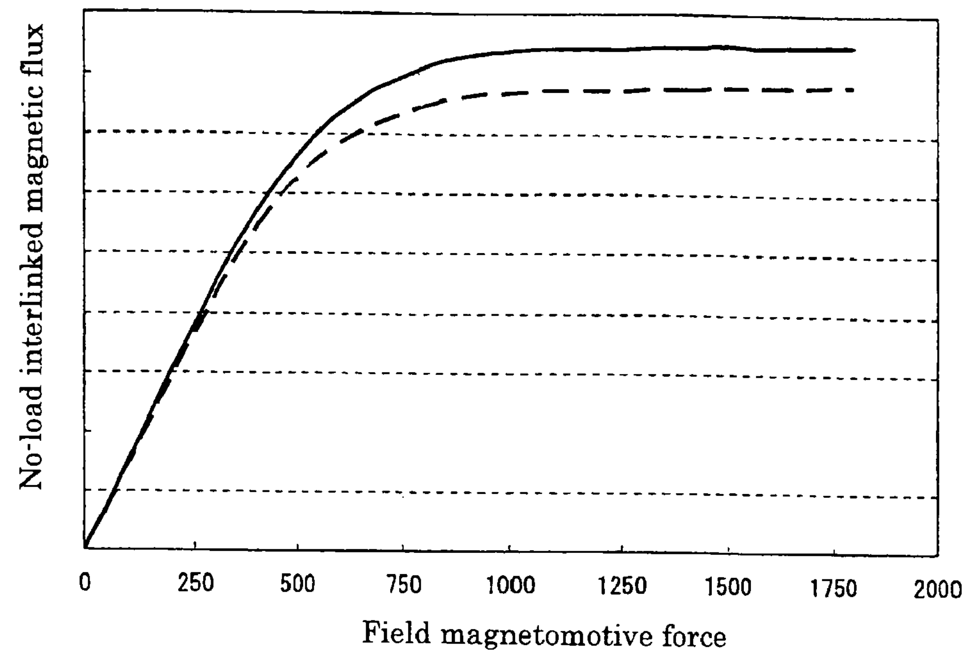
FIG. 8 is a graph that shows a relationship between field magnetomotive force and stator interlinked magnetic flux in the automotive alternator according to Embodiment 1 of the present invention.
Figure 9:
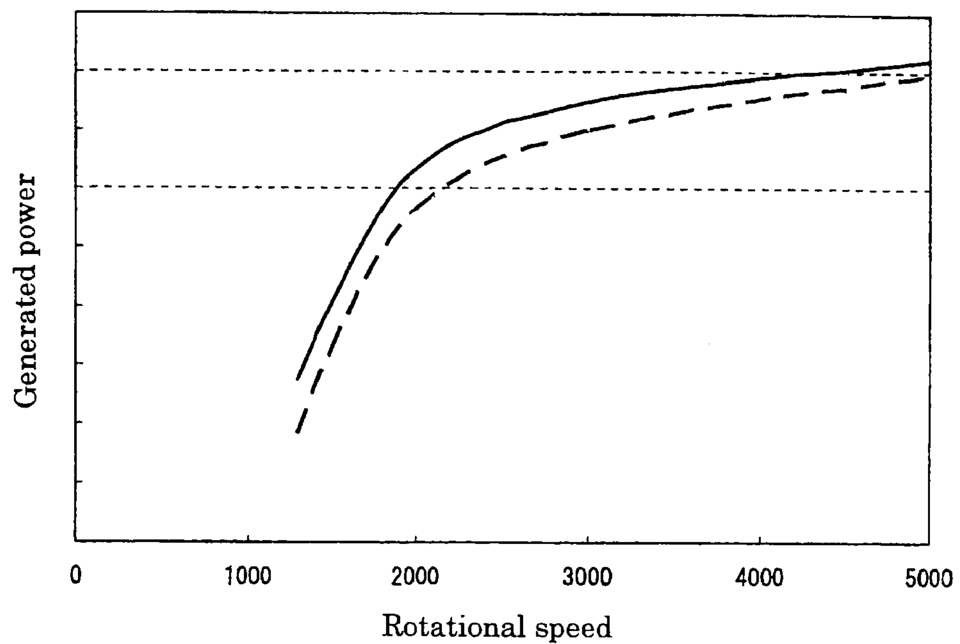
FIG. 9 is a graph that shows generated power relative to rotational frequency in the automotive alternator according to Embodiment 1 of the present invention.

Next, stator interlinked magnetic flux relative to field magnetomotive force (field ampere turns) and generated power relative to rotational frequency (direct current A) were measured using an automotive alternator 1 that was configured in this manner, and the results are shown in FIGS. 8 and 9. For comparison, a conventional device from which the first and second permanent magnets 32 and 37 were omitted was prepared, stator interlinked magnetic flux relative to field magnetomotive force and generated power relative to rotational frequency were measured, and the results are also shown in FIGS. 8 and 9. Moreover, in FIGS. 8 and 9, a solid line represents the present invention, and a broken line represents the conventional device.

It can be seen from FIG. 8 that the difference between the automotive alternator 1 and the conventional device is small in a region in which field magnetomotive force is small, and the difference between the automotive alternator 1 and the conventional device increases when a region in which magnetic saturation begins is exceeded. In other words, it can be seen that disposing the first and second permanent magnets 32 and 37 relieves magnetic saturation, thereby increasing the amount of magnetic flux that interlinks with the stator 10. Similarly, it can be seen from FIG. 9 that greater generated power can be obtained in the automotive alternator 1 than in the conventional device, particularly in a low rotational range.

In other words, in conventional devices, thirty percent or more of the magnetomotive force of the field is expended in the magnetic circuit of the rotor as a result of magnetic saturation, making it difficult to increase the amount of magnetic flux. In Embodiment 1, on the other hand, because magnetic saturation is relieved as described above, it can be inferred that the magnetic flux that interlinks with the stator 10 is increased, increasing generated power. In particular, it has been confirmed that generated power can be increased significantly in a low-speed idling region where magnetic saturation is pronounced.

In Embodiment 1, because first and second magnetic guidance members 30 and 35 are disposed so as to span over first and second trough portions 25 and 26, it is not necessary to fill the first and second trough portions 25 and 26 with the first and second magnetic guidance members 30 and 35, enabling the volume of the first and second magnetic guidance members 30 and 35 to be reduced. In addition, because first and second permanent magnets 32 and 37 are held by the first and second magnetic guidance members 30 and 35 that are disposed so as to span over the first and second trough portions 25 and 26, the first and second permanent magnets 32 and 37 can be a minimum required size. Thus, centrifugal forces that act on the first and second magnetic guidance members 30 and 35 and the first and second permanent magnets 32 and 37 during high-speed rotation are reduced, and the effects of displacement of the first and second claw-shaped magnetic pole portions 20 and 24 that result from the centrifugal forces and thermal expansion are also eliminated. The first and second permanent magnets 32 and 37 can thereby be held in the pole core 15 stably using a simple holding construction.

Because the first and second magnetic guidance members 30 and 35 link radially outer portions of inner wall surfaces of the first and second trough portions 25 and 26 circumferentially, occurrences of deformation of the pole core 15 can be suppressed.

Because the first and second magnetic guidance members 30 and 35 are prepared as separate parts from the first and second pole core bodies 17 and 21, milling precision is easily ensured, and interfitting surfaces of the first and second holding grooves 27 and 28 and interfitting surfaces of the first and second permanent magnets 32 and 37 can be prepared with high precision. Thus, because gaps at interfitting portions between the first and second magnetic guidance members 30 and 35 and the first and second yoke portions 19 and 23, and also gaps at interfitting portions between the first and second magnetic guidance members 30 and 35 and the first and second permanent magnets 32 and 37, can be kept to a minimum, reducing magnetic resistance at these interfitting portions, the amount of magnetic flux from the magnets is increased, enabling the magnets to be used effectively.

Because the first and second permanent magnets 32 and 37 are disposed so as to face inner circumferential surfaces near tip ends of the second and first claw-shaped magnetic pole portions 24 and 20, the first and second permanent magnets 32 and 37 are positioned radially inside an outermost circumferential surface of the rotor 13. Thus, stator slot harmonics are confined to outermost circumferential portions of the first and second claw-shaped magnetic pole portions 20 and 24, and do not act to heat the first and second permanent magnets 32 and 37 by direct induction. As a result, the first and second permanent magnets 32 and 37 are prevented from being heated and thermally demagnetized.

Because the first and second permanent magnets 32 and 37 are disposed so as to face the inner circumferential surfaces near the tip ends of the second and first claw-shaped magnetic pole portions 24 and 20, the magnetic circuits of the first and second permanent magnets 32 and 37 are closed magnetic circuits inside the rotor. In addition, because the first and second permanent magnets 32 and 37 are positioned entirely in an inside diameter portion of the second and first claw-shaped magnetic pole portions 24 and 20 when viewed from a radial direction, magnetic flux components that interact with the stator 10 are eliminated. Thus, the occurrence of voltages induced by the first and second permanent magnets 32 and 37 during no-load de-energization is suppressed. As a result, the magnet volume of the first and second permanent magnets 32 and 37 can be increased.

Because the first and second permanent magnets 32 and 37 are prepared into columnar bodies that have trapezoidal cross sections that have a predetermined thickness, the first and second permanent magnets 32 and 37 can be cut from a magnet base material efficiently using an abrasive wheel, increasing material yield.

Moreover, in Embodiment 1 above, first and second holding grooves 27 and 28 are recessed so as to have groove directions that are parallel to a central axis of a rotor 13 and so as to pass through from a first end to a second end of first and second yoke portions 19 and 23, but it is not absolutely necessary for first and second holding grooves to pass through axially, provided that they have an opening at the first end or the second end of the first and second yoke portions 19 and 23.

In Embodiment 1 above, the first and second permanent magnets 32 and 37 are fitted into the first and second magnetic guidance members 30 and 35, but the holding method for the permanent magnets is not limited to interfitting, and for example, a joining means such as an adhesive or brazing, etc., may also be used.

The first and second permanent magnets 32 and 37 are formed so as to have trapezoidal cross sections that have a predetermined thickness, but the first and second permanent magnets 32 and 37 are not limited to a particular cross-sectional shape provided that they are held by the first and second magnetic guidance members.

The first and second magnetic guidance members 30 and 35 may also be mounted by being press-fitted from axially outside or from axially inside into the first and second holding grooves 27 and 28 of the first and second pole core bodies 17 and 21 in an integrated state, and they may also be mounted by being press-fitted from axially outside into the first and second holding grooves 27 and 28 of the first and second pole core bodies 17 and 21 that have been assembled and integrated by alternately intermeshing the first and second claw-shaped magnetic pole portions 20 and 24.

Embodiment 2

Figure 10:
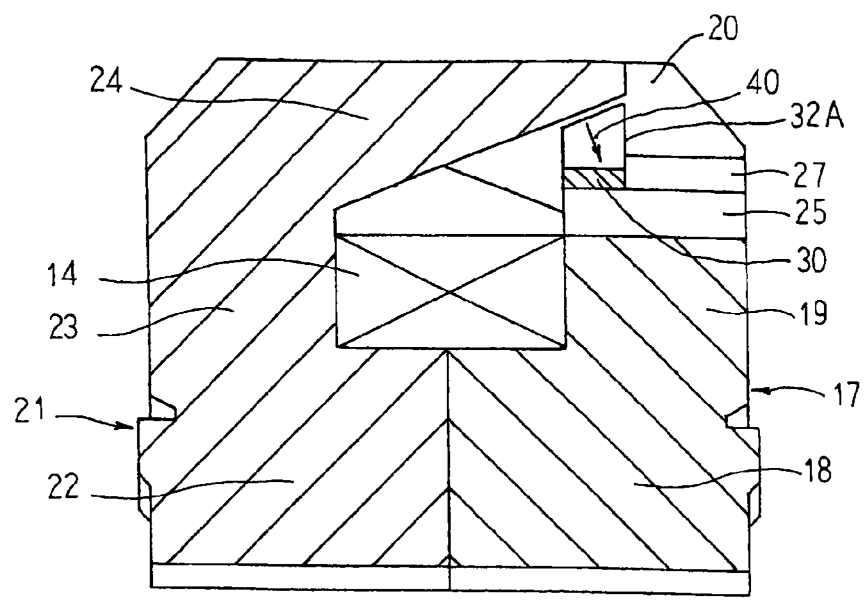
FIG. 10 is a cross section that shows part of a rotor that can be used in an automotive alternator according to Embodiment 2 of the present invention.
Figure 11:
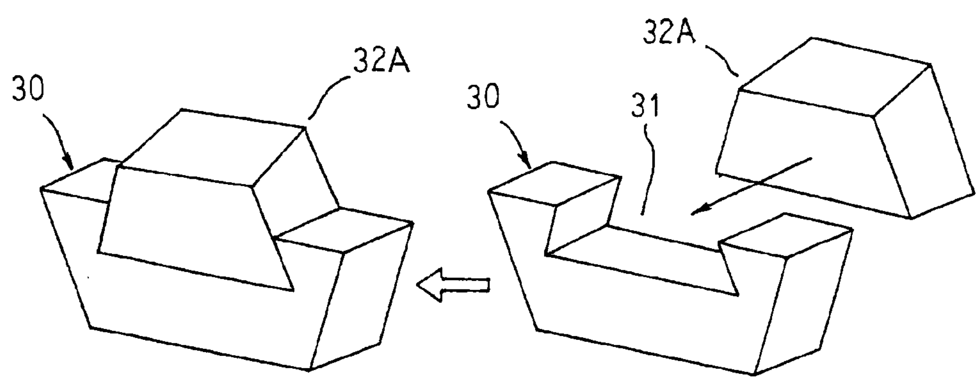
FIG. 11 is a perspective that explains a method for mounting a permanent magnet to a magnetic guidance member in the automotive alternator according to Embodiment 2 of the present invention.

FIG. 10 is a cross section that shows part of a rotor that can be used in an automotive alternator according to Embodiment 2 of the present invention, and FIG. 11 is a perspective that explains a method for mounting a permanent magnet to a magnetic guidance member in the automotive alternator according to Embodiment 2 of the present invention.

In FIGS. 10 and 11, upper surfaces of first permanent magnets 32A are formed into flat surfaces that are approximately parallel to inner circumferential surfaces near tip ends of second claw-shaped magnetic pole portions 24. Directions of magnetization 40 of the first permanent magnets 32A are perpendicular to those upper surfaces. Second permanent magnets 37 are prepared into identical shapes as the first permanent magnets 32 using an identical material.

Moreover, the rest of the configuration is configured in a similar manner to Embodiment 1 above.

In a rotor 13A that is configured in this manner, because upper surfaces of first permanent magnets 32A are approximately parallel to inner circumferential surfaces near tip ends of facing second claw-shaped magnetic pole portions 24, gaps between the first permanent magnets 32A and the second claw-shaped magnetic pole portions 24 can be reduced. Thus, magnet magnetic flux does not enter the first permanent magnets 32A from the inner circumferential surfaces near the tip ends of the second claw-shaped magnetic pole portions 24, reducing the amount of magnetic flux that leaks. Because the first permanent magnets 32A are magnetized in a direction that is perpendicular to their upper surfaces, magnet magnetic flux does not enter the first permanent magnets 32A from the inner circumferential surfaces near the tip ends of the second claw-shaped magnetic pole portions 24, reducing the amount of magnetic flux that leaks. In addition, by making the upper surfaces of the first permanent magnets 32A inclined surfaces, magnetic pole area can be used maximally, enabling the amount of effective magnetic flux to be increased.

Although not shown, because second permanent magnets are also configured in a similar manner to the first permanent magnets, magnet magnetic flux does not enter inner circumferential surfaces near tip ends of first claw-shaped magnetic pole portions 20 from the second permanent magnets, reducing the amount of magnetic flux that leaks, and also enabling the amount of effective magnetic flux to be increased.

Thus, according to Embodiment 2, because the magnetic flux that originates from the permanent magnets does not flow through the closed magnetic circuit inside the rotor, the amount of magnetic flux that leaks is reduced, and the amount of effective magnetic flux is increased, output can be increased.

Embodiment 3

Figures 12, 13:
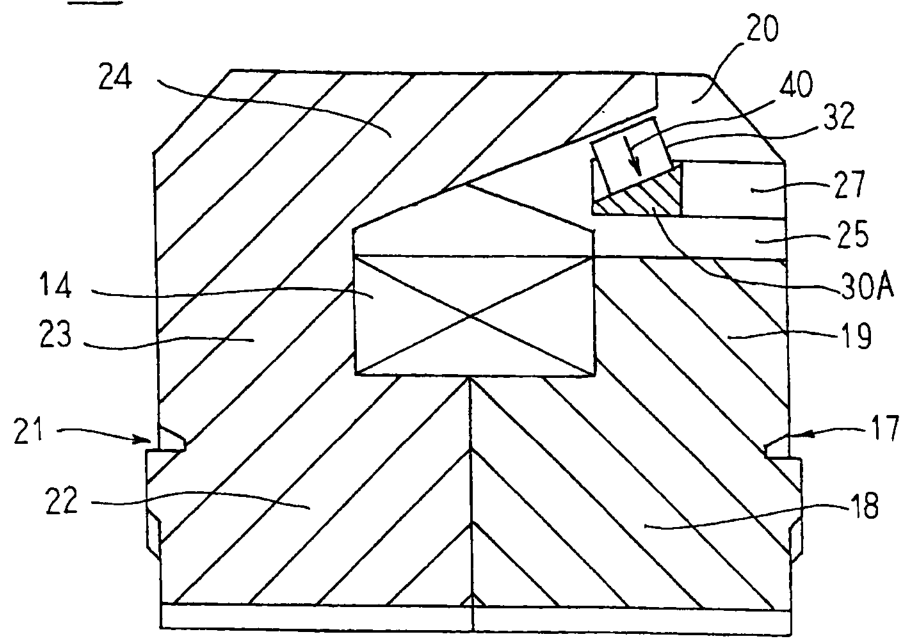
FIG. 12 is a cross section that shows part of a rotor that can be used in an automotive alternator according to Embodiment 3 of the present invention.
FIG. 13 is a perspective that explains a method for mounting a permanent magnet to a magnetic guidance member in the automotive alternator according to Embodiment 3 of the present invention.

FIG. 12 is a cross section that shows part of a rotor that can be used in an automotive alternator according to Embodiment 3 of the present invention, and FIG. 13 is a perspective that explains a method for mounting a permanent magnet to a magnetic guidance member in the automotive alternator according to Embodiment 3 of the present invention.

In FIGS. 12 and 13, first magnetic guidance members 30A are formed such that bottom surfaces of first interfitting grooves 31A are flat surfaces that are approximately parallel to inner circumferential surfaces near tip ends of second claw-shaped magnetic pole portions 24. Here, second magnetic guidance members are also configured in a similar manner to the first magnetic guidance members 30A.

Moreover, the rest of the configuration is configured in a similar manner to Embodiment 1 above.

In a rotor 13B that is configured in this manner, the first magnetic guidance members 30A are disposed so as to span over first trough portions 25 by being fitted into first holding grooves 27, and first permanent magnets 32 are fitted into the first interfitting grooves 31A. Here, because the bottom surfaces of the first interfitting grooves 31A of the first magnetic guidance members 30A are formed into flat surfaces that are approximately parallel to the inner circumferential surfaces near the tip ends of the second claw-shaped magnetic pole portions 24, upper surfaces of the first permanent magnets 32 are approximately parallel to the inner circumferential surfaces near the tip ends of the second claw-shaped magnetic pole portions 24, and directions of magnetization 40 are approximately perpendicular to the inner circumferential surfaces near the tip ends of the second claw-shaped magnetic pole portions 24. Moreover, upper surfaces of the second permanent magnets are also approximately parallel to inner circumferential surfaces near tip ends of first claw-shaped magnetic pole portions 20, and directions of magnetization 40 are approximately perpendicular to the inner circumferential surfaces near the tip ends of the first claw-shaped magnetic pole portions 20.

Consequently, in Embodiment 3, the magnetic flux that originates from the permanent magnets also does not flow through the closed magnetic circuit inside the rotor, reducing the amount of magnetic flux that leaks, increasing the amount of effective magnetic flux, and enabling output to be increased.

According to Embodiment 3, because bottom surfaces of interfitting grooves of magnetic guidance members are made into inclined surfaces, making upper surfaces of the permanent magnets into inclined surfaces, which is a factor in cost increases, is no longer necessary, enabling output to be increased using an inexpensive configuration.

Embodiment 4

Figure 14:
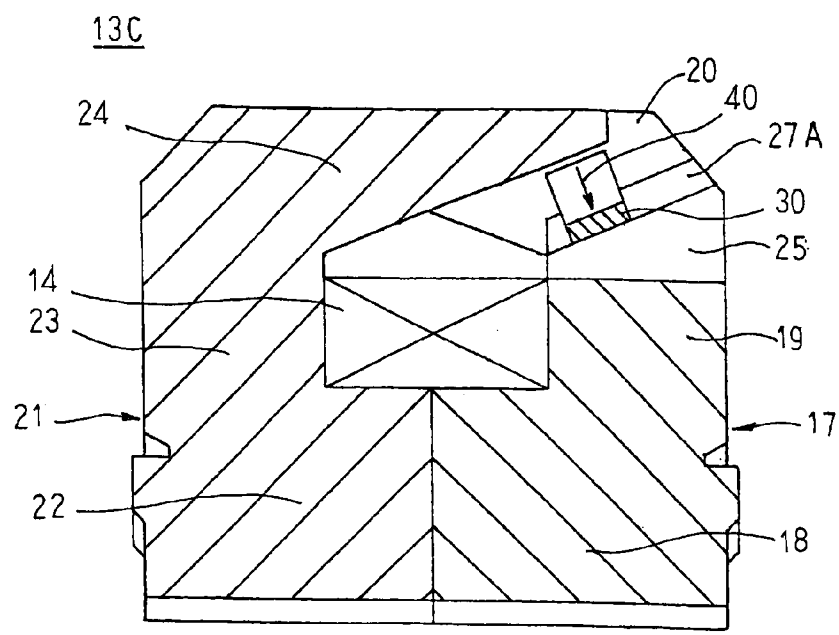
FIG. 14 is a cross section that shows part of a rotor that can be used in an automotive alternator according to Embodiment 4 of the present invention.

FIG. 14 is a cross section that shows part of a rotor that can be used in an automotive alternator according to Embodiment 4 of the present invention.

In FIG. 14, first holding grooves 27A are formed such that groove directions thereof are approximately parallel to inner circumferential surfaces near tip ends of second claw-shaped magnetic pole portions 24. Here, second holding grooves are also configured in a similar manner to the first holding grooves 27A.

Moreover, the rest of the configuration is configured in a similar manner to Embodiment 1 above.

In a rotor 13C that is configured in this manner, first magnetic guidance members 30 are disposed so as to span over first trough portions 25 by being fitted into the first holding grooves 27A, and first permanent magnets 32 are fitted into first interfitting grooves 31. Here, because the groove directions of the first holding grooves 27A are formed approximately parallel to inner circumferential surfaces near tip ends of second claw-shaped magnetic pole portions 24, bottom surfaces of the first interfitting grooves 31, that is, upper surfaces of the first permanent magnets 32, are approximately parallel to the inner circumferential surfaces near the tip ends of the second claw-shaped magnetic pole portions 24, and directions of magnetization 40 are approximately perpendicular to the inner circumferential surfaces near the tip ends of the second claw-shaped magnetic pole portions 24. Moreover, upper surfaces of the second permanent magnets are also approximately parallel to inner circumferential surfaces near tip ends of first claw-shaped magnetic pole portions 20, and directions of magnetization 40 are approximately perpendicular to the inner circumferential surfaces near the tip ends of the first claw-shaped magnetic pole portions 20.

Consequently, in Embodiment 4, the magnetic flux that originates from the permanent magnets also does not flow through the closed magnetic circuit inside the rotor, reducing the amount of magnetic flux that leaks, increasing the amount of effective magnetic flux, and enabling output to be increased.

According to Embodiment 4, because the groove directions of the holding grooves are approximately parallel to the inner circumferential surfaces near the tip ends of the claw-shaped magnetic pole portions, making upper surfaces of the permanent magnets into inclined surfaces, which is a factor in cost increases, is no longer necessary, enabling output to be increased using an inexpensive configuration.

Embodiment 5

Figure 15:
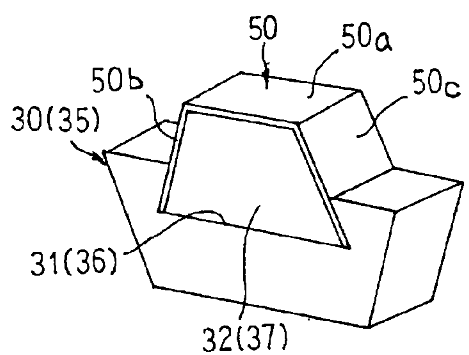
FIG. 15 is a perspective that explains a method for mounting a permanent magnet to a magnetic guidance member in an automotive alternator according to Embodiment 5 of the present invention.

FIG. 15 is a perspective that explains a method for mounting a permanent magnet to a magnetic guidance member in an automotive alternator according to Embodiment 5 of the present invention.

In FIG. 15, magnet protecting covers 50 are molded into angular U-shaped cross sections that have a splayed shape that is constituted by: a rectangular base portion 50*a*; and first and second wing portions 50*b* and 50*c* that are disposed so as to extend from two opposite sides of the base portion 50*a*. The magnet protecting covers 50 are mounted onto first and second permanent magnets 32 and 37 such that the base portions 50*a* are placed on upper surfaces of the first and second permanent magnets 32 and 37, and the first and second wing portions 50*b* and 50*c* are placed alongside two side surfaces that are fitted into the first and second interfitting grooves 31 and 36, and are fitted into the first and second interfitting grooves 31 and 36 together with the first and second permanent magnets 32 and 37.

Moreover, the rest of the configuration is configured in a similar manner to Embodiment 1 above.

In Embodiment 5, because the upper surfaces and two side surfaces of the first and second permanent magnets 32 and 37 are covered by the magnet protecting covers 50, even if the first and second claw-shaped magnetic pole portions 20 and 24 vibrate in a radial direction and do happen to contact the first and second permanent magnets 32 and 37, the magnet protecting covers 50 function as a buffer layer, enabling occurrences of damage to the first and second permanent magnets 32 and 37 to be suppressed. The exposed surface area of the first and second permanent magnets 32 and 37 is also reduced, also suppressing damage and scattering of the first and second permanent magnets 32 and 37.

Now, the magnet protecting covers 50 are interposed between the first and second permanent magnets 32 and 37 and the second and first claw-shaped magnetic pole portions 24 and 20. Thus, if the magnet protecting covers 50 are prepared using a magnetic material, the magnetic flux that leaves the permanent magnets flows through the magnet protecting covers 50 and enters the magnetic guidance members, and because a magnetic path that returns to the permanent magnet is formed and the amount of magnetic flux entering the facing claw-shaped magnetic pole portions is reduced, it is necessary to increase the magnet volume of the permanent magnets. Because of this, it is desirable to prepare the magnet protecting covers using a nonmagnetic material, for example, a stainless alloy or a synthetic resin.

The magnet protecting covers 50 are fixed by interposing the first and second wing portions 50*b* and 50*c* between the side surfaces of the first and second interfitting grooves 31 and 36 and the side surfaces of the first and second permanent magnets 32 and 37, but the magnet protecting covers 50 may also be fixed by brazing, etc., the first and second wing portions 50*b* and 50*c* to the first and second magnetic guidance members 30 and 35.

Embodiment 6

Figure 16:
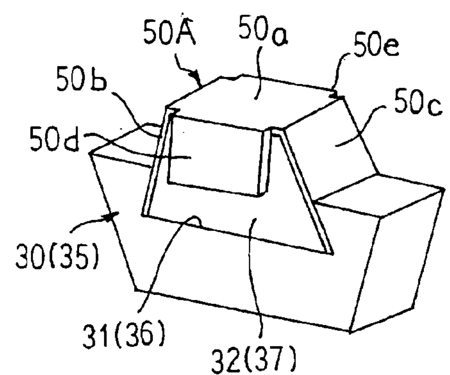
FIG. 16 is a perspective that explains a method for mounting a permanent magnet to a magnetic guidance member in an automotive alternator according to Embodiment 6 of the present invention.

FIG. 16 is a perspective that explains a method for mounting a permanent magnet to a magnetic guidance member in an automotive alternator according to Embodiment 6 of the present invention.

In FIG. 16, magnet protecting covers 50A include a base portion 50*a* and first and second wing portions 50*b* and 50*c*, and also third and fourth wing portions 50*d* and 50*e* that are disposed so as to extend from two remaining opposite sides of the base portion 50*a*. The magnet protecting covers 50A are mounted onto first and second permanent magnets 32 and 37 such that the base portions 50*a* are placed on upper surfaces of the first and second permanent magnets 32 and 37, the first and second wing portions 50*b* and 50*c* are placed alongside two side surfaces that are fitted into the first and second interfitting grooves 31 and 36, and the third and fourth wing portions 50*d* and 50*e* are also placed alongside two end surfaces of the first and second permanent magnets 32 and 37 in a thickness direction, and are fitted into the first and second interfitting grooves 31 and 36 together with the first and second permanent magnets 32 and 37.

Moreover, the rest of the configuration is configured in a similar manner to Embodiment 5 above.

According to Embodiment 6, because the exposed surface area of the first and second permanent magnets 32 and 37 is further reduced, occurrences of damage to the first and second permanent magnets 32 and 37 can be further suppressed.

Embodiment 7

Figure 17:
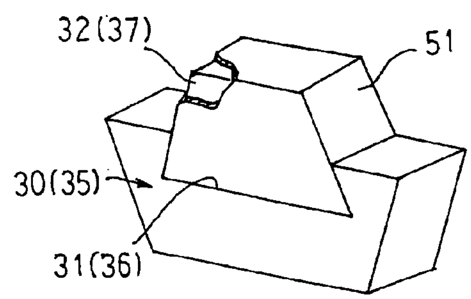
FIG. 17 is a perspective that explains a method for mounting a permanent magnet to a magnetic guidance member in an automotive alternator according to Embodiment 7 of the present invention.

FIG. 17 is a partially cut away perspective that explains a method for mounting a permanent magnet to a magnetic guidance member in an automotive alternator according to Embodiment 7 of the present invention.

In FIG. 17, first and second permanent magnets 32 and 37 are molded in a resin so as to be completely covered by a resin layer 51.

Moreover, the rest of the configuration is configured in a similar manner to Embodiment 5 above.

According to Embodiment 7, because the first and second permanent magnets 32 and 37 are entirely covered by the resin layer 51, occurrences of damage to the first and second permanent magnets 32 and 37 can be further suppressed.

Embodiment 8

Figure 18:
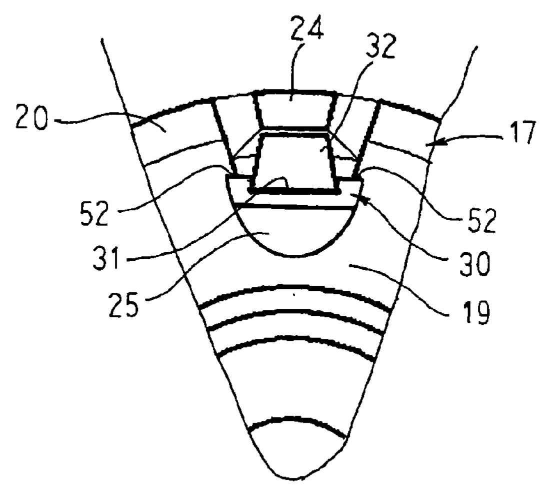
FIG. 18 is an end elevation that shows part of a rotor that can be used in an automotive alternator according to Embodiment 8 of the present invention.

FIG. 18 is an end elevation that shows part of a rotor that can be used in an automotive alternator according to Embodiment 8 of the present invention.

In FIG. 18, pairs of bracing portions 52 are disposed so as to project from facing portions radially outside inner wall surfaces of first trough portions 25. First magnetic guidance members 30 are fixed to the inner wall surfaces of the first trough portions 25 using an adhesive, etc., and are disposed so as to span over the first trough portions 25 such that upper surfaces thereof are placed in contact with the bracing portions 52, and two circumferential side surfaces thereof are disposed on radially outer sides of the first trough portions 25. Here, bracing portions are also disposed so as to project from second trough portions, and second magnetic guidance members are disposed so as to span in a similar manner.

Moreover, the rest of the configuration is configured in a similar manner to Embodiment 1 above.

In Embodiment 8, because the first magnetic guidance members 30 are disposed so as to span over the first trough portions 25, the volume of the first magnetic guidance members 30 can be reduced. Thus, centrifugal forces that act on the first magnetic guidance members 30 can be reduced, and effects of displacement of the second claw-shaped magnetic pole portions 24 are also eliminated. The centrifugal forces that act on the first magnetic guidance members 30 are borne by a fixing force from the adhesive, etc., and also by the bracing portions 52. Moreover, the same also applies to the second magnetic guidance members.

Thus, in Embodiment 8, first and second permanent magnets can also be held in a pole core stably using a simple holding construction. Because the first magnetic guidance members 30 are disposed so as to span the first trough portions 25 so as to be linked to the first yoke portion 19 magnetically, magnetic flux that originates in the first permanent magnets 32 can be guided circumferentially and made to flow to the first yoke portion 19, enabling magnetic saturation in the first yoke portion 19 to be alleviated.

Embodiment 9

Figure 19:
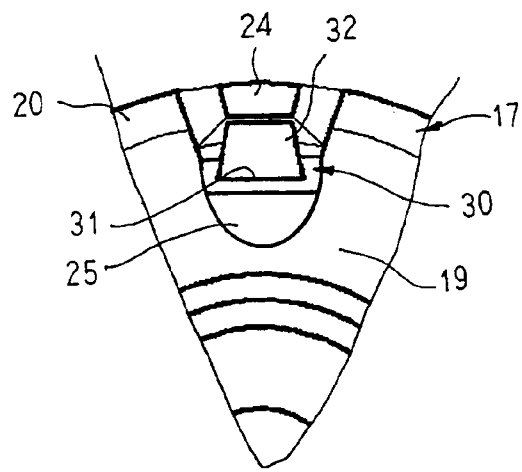
FIG. 19 is an end elevation that shows part of a rotor that can be used in an automotive alternator according to Embodiment 9 of the present invention.

FIG. 19 is an end elevation that shows part of a rotor that can be used in an automotive alternator according to Embodiment 9 of the present invention.

In FIG. 19, first magnetic guidance members 30 are disposed on radially outer portions of first trough portions 25, and are disposed so as to span over the first trough portions 25 such that two circumferential side surfaces thereof are fixed to inner wall surfaces of the first trough portions 25 using an adhesive, brazing, etc. Here, second magnetic guidance members are also disposed so as to span in a similar manner.

Moreover, the rest of the configuration is configured in a similar manner to Embodiment 1 above.

In Embodiment 9, because the first magnetic guidance members 30 are disposed so as to span over the first trough portions 25, the volume of the first magnetic guidance members 30 can be reduced. Thus, centrifugal forces that act on the first magnetic guidance members 30 can be reduced, and effects of displacement of the second claw-shaped magnetic pole portions 24 are also eliminated. The centrifugal forces that act on the first magnetic guidance members 30 are borne by a fixing force from the adhesive, brazing, etc. Moreover, the same also applies to the second magnetic guidance members.

Thus, in Embodiment 9, first and second permanent magnets can also be held in a pole core stably using a simple holding construction. Because the first magnetic guidance members 30 are disposed so as to span the first trough portions 25 so as to be linked to the first yoke portion 19 magnetically, magnetic flux that originates in the first permanent magnets 32 can be guided circumferentially and made to flow to the first yoke portion 19, enabling magnetic saturation in the first yoke portion 19 to be alleviated.

Embodiment 10

Figure 20:
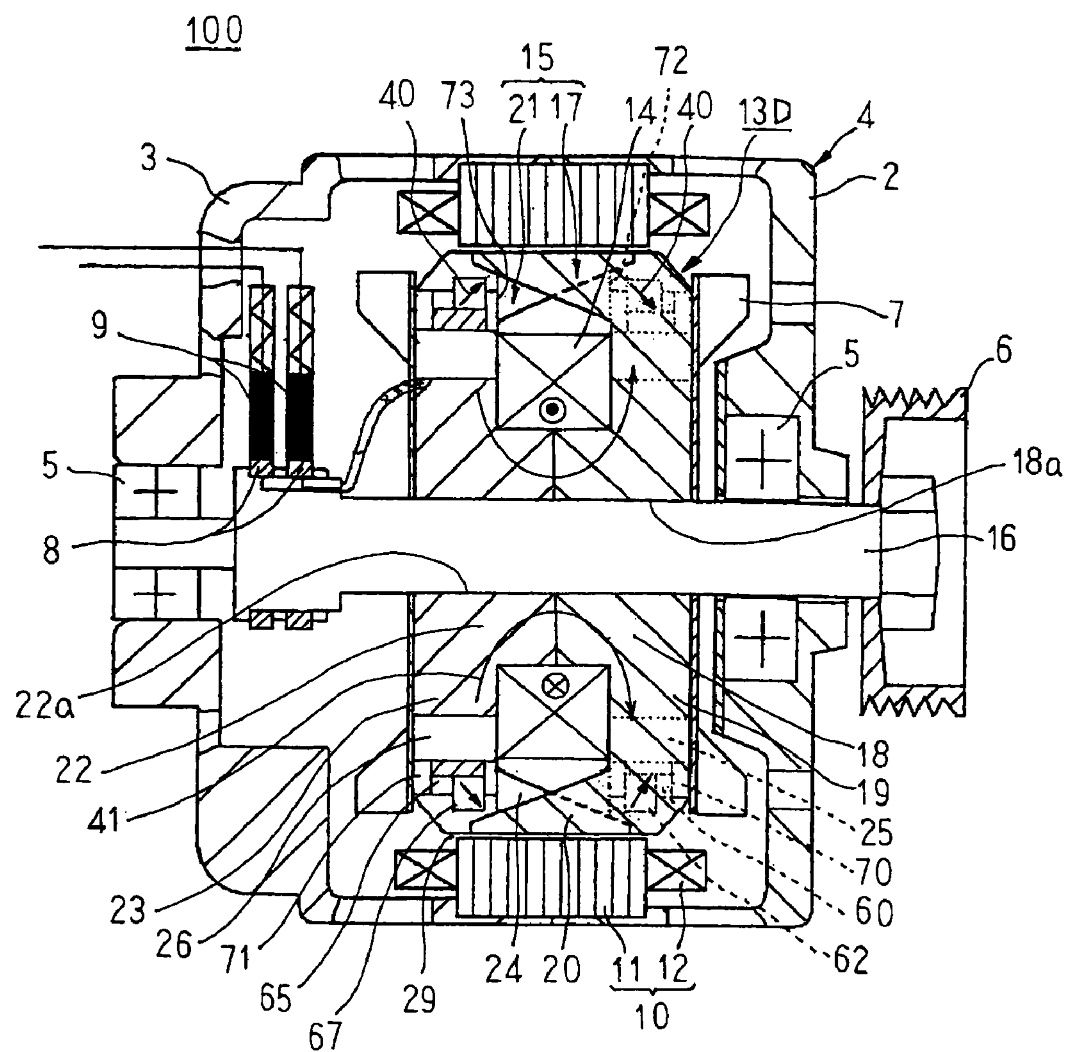
FIG. 20 is a cross section that schematically shows an automotive alternator according to Embodiment 10 of the present invention.
Figure 21:
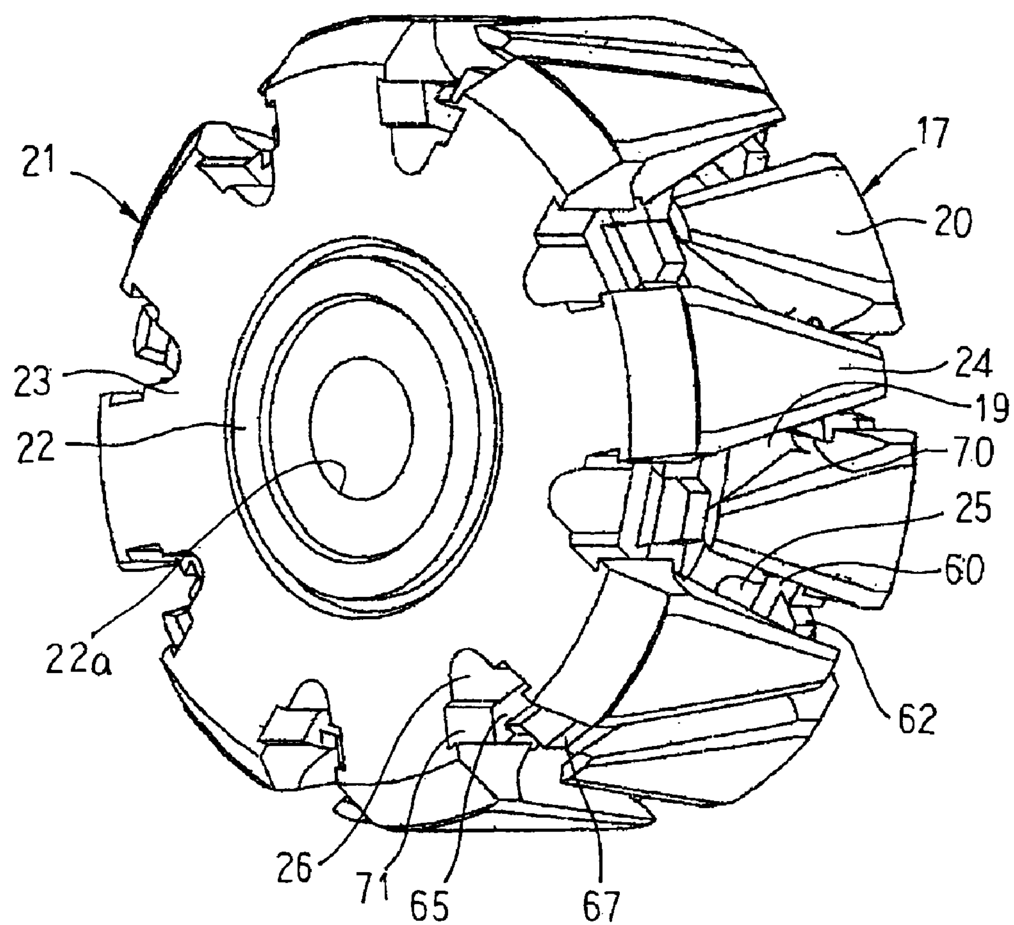
FIG. 21 is a perspective that shows a rotor that can be used in the automotive alternator according to Embodiment 10 of the present invention.
Figure 22:
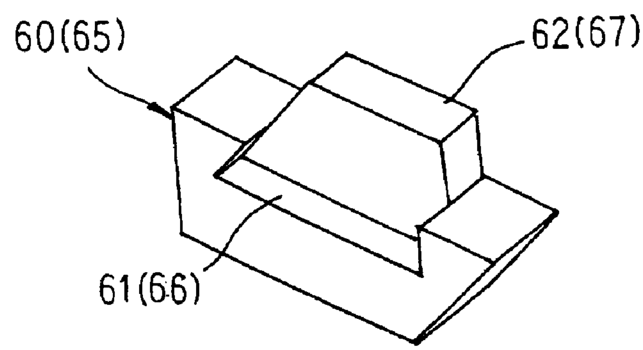
FIG. 22 is a perspective that explains a method for mounting a permanent magnet to a magnetic guidance member in the automotive alternator according to Embodiment 10 of the present invention.
Figures 23, 24:
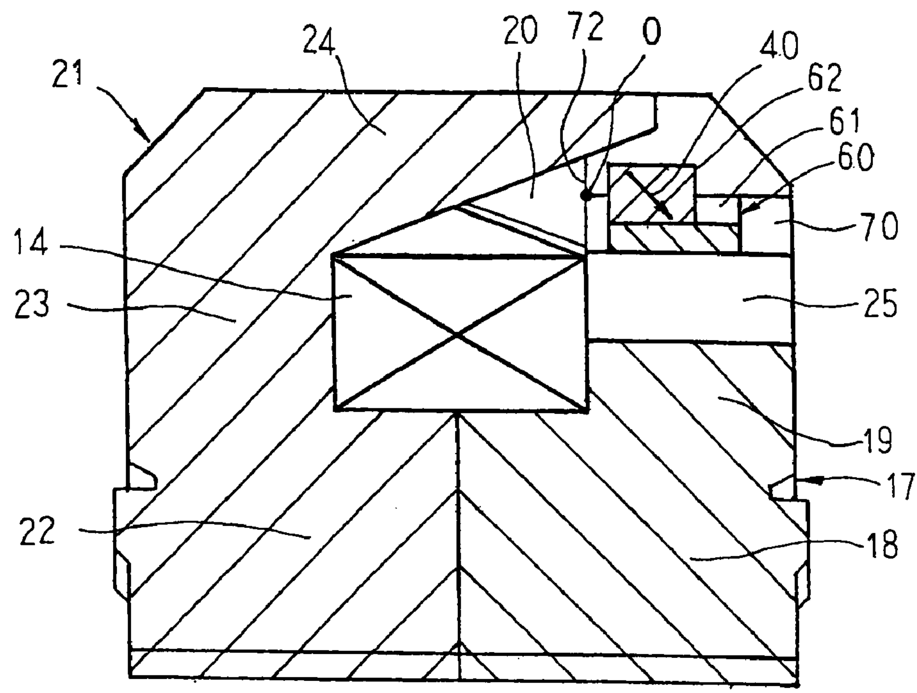
FIG. 23 is a cross section that shows part of the rotor that can be used in the automotive alternator according to Embodiment 10 of the present invention.
FIG. 24 is a cross section that shows part of the rotor that can be used in the automotive alternator according to Embodiment 10 of the present invention.

FIG. 20 is a cross section that schematically shows an automotive alternator according to Embodiment 10 of the present invention, FIG. 21 is a perspective that shows a rotor that can be used in the automotive alternator according to Embodiment 10 of the present invention, FIG. 22 is a perspective that explains a method for mounting a permanent magnet to a magnetic guidance member in the automotive alternator according to Embodiment 10 of the present invention, and FIGS. 23 and 24 are each cross sections that show parts of the rotor that can be used in the automotive alternator according to Embodiment 10 of the present invention.

In FIGS. 20 through 24, an automotive alternator 100 includes: a case 4 that is constituted by a front bracket 2 and a rear bracket 3 that are each made of aluminum in an approximate cup shape; a rotor 13D that is rotatably disposed inside the case 4 such that a rotating shaft 16 is supported by means of bearings 5 in the case 4; a pulley 6 that is fixed to an end portion of the rotating shaft 16 that projects outward at a front end of the case 4; fans 7 that are fixed to two end surfaces in an axial direction of the rotor 13D (hereinafter "axial direction"); a stator 10 that is fixed to the case 4 so as to surround an outer circumference of the rotor 13D so as to have a constant air gap 29 relative to the rotor 13D; a pair of slip rings 8 that are fixed to a rear end of the rotating shaft 16, and that supply current to the rotor 13D; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13D.

The rotor 13D includes: a field coil 14 that generates magnetic flux on passage of an excitation current; a pole core 15 that is disposed so as to cover the field coil 14 and in which magnetic poles are formed by that magnetic flux; and the rotating shaft 16, which is fitted through a central axial position of the pole core 15.

The pole core 15 is configured so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and in which a rotating shaft insertion aperture **18*a* is formed so as to pass through a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially. In addition, first trough portions 25 are recessed so as to have U shapes that curve concavely toward a radially-inner side at portions that are positioned between respective adjacent first claw-shaped magnetic pole portions 20 of the first yoke portion 19**.

The second pole core body 21 has: a second boss portion 22 that has an outer circumferential surface that has a cylindrical shape, and in which a rotating shaft insertion aperture **22*a* is formed so as to pass through a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially. In addition, second trough portions 26 are recessed so as to have U shapes that curve concavely toward a radially-inner side at portions that are positioned between respective adjacent second claw-shaped magnetic pole portions 24 of the second yoke portion 23**.

Now, the first and second pole core bodies 17 and 21 are prepared by forming a core body that has a shape in which portions that correspond to claw-shaped magnetic pole portions project radially outward from a yoke portion using a cold forging method, and then bending approximately at right angles the portions that correspond to claw-shaped magnetic pole portions that extend radially outward from the yoke portion. First bending lines 72 when bending and shaping the first claw-shaped magnetic pole portions 20 are formed so as to extend radially on boundaries between the first yoke portion 19 and the first claw-shaped magnetic pole portions 20. Second bending lines 73 when bending and shaping the second claw-shaped magnetic pole portions 24 are formed so as to extend radially on boundaries between the second yoke portion 23 and the second claw-shaped magnetic pole portions 24.

First and second pole core bodies 17 and 21 that are configured in this manner are fixed to the rotating shaft 16 that has been fitted through the rotating shaft insertion apertures 18*a* and 22*a* such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Here, the first and second boss portions 18 and 22 and the first and second yoke portions 19 and 23 correspond to a boss portion and first and second yoke portions of the pole core 15. Furthermore, tip end portions of the first and second claw-shaped magnetic pole portions 20 and 24 overlap with the second and first yoke portions 23 and 19, respectively, in the axial direction.

First magnetic guidance members 60 are prepared so as to have trapezoidal cross sections that have a predetermined thickness using a magnetic material such as iron, or a ferromagnetic alloy, etc. Interfitting grooves 61 that have groove directions in a thickness direction of the first magnetic guidance members 60 are recessed into upper surfaces of the first magnetic guidance members 60 so as to have openings. Here, upper and lower surfaces of the first magnetic guidance members 60 and bottom surfaces of the interfitting grooves 61 are mutually parallel flat surfaces. The first interfitting grooves 61 are formed so as to have wedge shapes in which groove widths become gradually narrower toward the openings. First permanent magnets 62 are prepared so as to have external shapes that conform to internal shapes of the first interfitting grooves 61, that is, so as to have trapezoidal cross sections in planes that are perpendicular to a thickness direction, and so as to have a thickness that is thinner than that of the first magnetic guidance members 60, and upper and lower surfaces (an outer circumferential surface and an inner circumferential surface) of the first permanent magnets 62 are mutually parallel flat surfaces. The first permanent magnets 62 are fitted into the first interfitting grooves 61 such that their thickness directions are oriented in the thickness direction of the first magnetic guidance members 60, and first end surfaces of the first permanent magnets 62 and first end surfaces of the first magnetic guidance members 60 are positioned in a common plane, and are held in the first magnetic guidance members 60 by applying an adhesive if required. Thus, the bottom surfaces of the first interfitting grooves 61 and the lower surfaces of the first permanent magnets 62 face each other in close contact or so as to have minute gaps, and the first magnetic guidance members 60 and the first permanent magnets 62 are connected magnetically.

Second magnetic guidance members 65 are prepared into identical shapes as the first magnetic guidance members 60 using an identical material. Second permanent magnets 67 are prepared into identical shapes as the first permanent magnets 62 using an identical material. The second permanent magnets 67 are fitted into the second interfitting grooves 66 such that their thickness directions are oriented in the thickness direction of the second magnetic guidance members 65, and first end surfaces of the second permanent magnets 67 and first end surfaces of the second magnetic guidance members 65 are positioned in a common plane, and are held in the second magnetic guidance members 65 by applying an adhesive if required. Thus, the bottom surfaces of the second interfitting grooves 66 and the lower surfaces of the second permanent magnets 67 face each other in close contact or so as to have minute gaps, and the second magnetic guidance members 65 and the second permanent magnets 67 are connected magnetically.

First holding grooves 70 are recessed so as to reach from a first end toward a second end portion of the first yoke portion 19 to the first bending lines 72 near roots of respective first claw-shaped magnetic pole portions 20 of the first pole core body 17 so as to have openings at respective facing portions radially outside inner walls surfaces of the respective first trough portions 25 and so as to have groove directions in the axial direction. Similarly, second holding grooves 71 are recessed so as to reach from a second end toward a first end portion of the second yoke portion 23 to the second bending lines 73 near roots of respective second claw-shaped magnetic pole portions 24 of the second pole core body 21 so as to have openings at respective facing portions radially outside inner walls surfaces of the respective second trough portions 26 and so as to have groove directions in the axial direction. Here, the first and second holding grooves 70 and 71 are formed by broaching, or end milling, etc., so as to have groove shapes into which two side portions of the first and second magnetic guidance members 60 and 65 can be fitted.

The first magnetic guidance members 60 are mounted to the first pole core body 17 by being press-fitted into the facing first holding grooves 70 from axially outside with the first permanent magnets 62 oriented upward so as to be magnetically connected when disposed so as to span each of the first trough portions 25, adhesive being applied if required. At that point, the thickness directions of the first magnetic guidance members 60 and the first permanent magnets 62 are oriented in the axial direction. The first interfitting grooves 61 have openings in directions that are positioned radially outside the first magnetic guidance members 60 that are fitted into and held by the first holding grooves 70.

The first permanent magnets 62 are held in the first magnetic guidance members 60 such that centers thereof are shifted toward the field coil 14 relative to centers of the first magnetic guidance members 60 in the thickness direction, that is, offset axially toward the field coil 14. Ends of the first permanent magnets 62 near the field coil 14 overlap with the second claw-shaped magnetic pole portions 24 in the axial direction, and opposite ends of the first permanent magnets 62 from the field coil 14 do not overlap with the second claw-shaped magnetic pole portions 24. When viewed from radially outside, portions of the first permanent magnets 62 are exposed from the second claw-shaped magnetic pole portions 24, and remaining portions are positioned in an inside diameter portion of the second claw-shaped magnetic pole portions 24, and upper surfaces thereof face inner circumferential surfaces near the tip ends of the second claw-shaped magnetic pole portions 24 so as to leave a predetermined clearance. Bottom surfaces of the first interfitting grooves 61 and lower surfaces of the first permanent magnets 62 are formed into flat surfaces that are tangential to a cylindrical surface that is coaxial with the rotor 13D. Cross sections of the first permanent magnets 62 in planes that include the central axis of the rotor 13D are rectangular. Moreover, centers of the permanent magnets are portions that constitute centers between the upper surfaces and the lower surfaces of the permanent magnets and centers in the thickness direction.

The second magnetic guidance members 65 are mounted to the second pole core body 21 by being press-fitted into the facing second holding grooves 71 from axially outside with the second permanent magnets 67 oriented upward so as to be magnetically connected when disposed so as to span each of the second trough portions 26, adhesive being applied if required. At that point, the thickness directions of the second magnetic guidance members 65 and the second permanent magnets 67 are oriented in the axial direction. The second interfitting grooves 66 have openings in directions that are positioned radially outside the second magnetic guidance members 65 that are fitted into and held by the second holding grooves 71.

The second permanent magnets 67 are held in the second magnetic guidance members 65 such that centers thereof are shifted toward the field coil 14 relative to centers of the second magnetic guidance members 65 in the thickness direction, that is, offset axially toward the field coil 14. Ends of the second permanent magnets 67 near the field coil 14 overlap with the first claw-shaped magnetic pole portions 20 in the axial direction, and opposite ends of the second permanent magnets 67 from the field coil 14 do not overlap with the first claw-shaped magnetic pole portions 20. When viewed from radially outside, portions of the second permanent magnets 67 are exposed from the first claw-shaped magnetic pole portions 20, and remaining portions are positioned at an inside diameter portion of the first claw-shaped magnetic pole portions 20, and upper surfaces thereof face inner circumferential surfaces near the tip ends of the first claw-shaped magnetic pole portions 20 so as to leave a predetermined clearance. Bottom surfaces of the second interfitting grooves 66 and lower surfaces of the second permanent magnets 67 are formed into flat surfaces that are tangential to a cylindrical surface that is coaxial with the rotor 13D. Cross sections of the second permanent magnets 67 in planes that include the central axis of the rotor 13D are rectangular.

The first permanent magnets 62 are magnetically oriented such that directions of magnetization 40 are inclined so as to have gradients that ascend toward the field coil 14 in planes that include the central axis of the rotor 13D and that pass through the centers of the first permanent magnets 62. Extensions of the directions of magnetization 40 that pass through the centers of the first permanent magnets 62 are oriented toward the inner circumferential surfaces near the tip ends of the facing second claw-shaped magnetic pole portions 24. Similarly, the second permanent magnets 67 are magnetically oriented such that directions of magnetization 40 are inclined so as to have gradients that ascend toward the field coil 14 in planes that include the central axis of the rotor 13D and that pass through the centers of the second permanent magnets 67. Extensions of the directions of magnetization 40 that pass through the centers of the second permanent magnets 67 are oriented toward the inner circumferential surfaces near the tip ends of the facing first claw-shaped magnetic pole portions 20. If the magnetic field 41 is generated in the direction of the arrow shown in FIG. 20 when an electric current is passed through the field coil 14, the first and second permanent magnets 62 and 67 are magnetically oriented in a reverse direction to the magnetic field 41. Moreover, in the case of a design in which the orientation of the magnetic field 41 that the field current that flows through the field coil 14 produces is inverted, the first and second permanent magnets 62 and 67 will also be magnetically oriented in a reverse direction.

Next, action of an automotive alternator 100 that has been configured in this manner will be explained.

First, current is supplied from a battery (not shown) to the field coil 14 of the rotor 13D by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13D. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Figure 25:
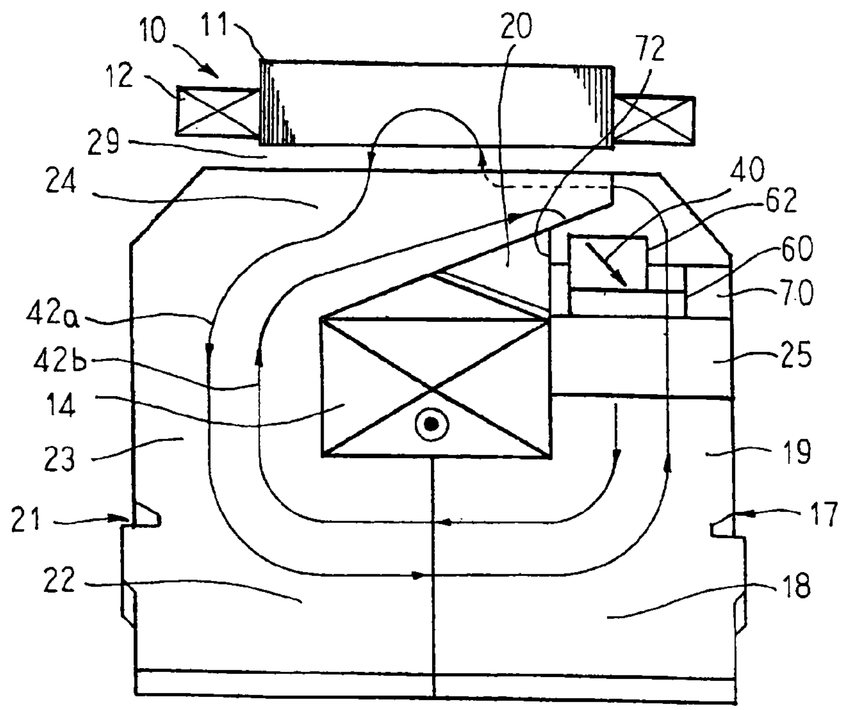
FIG. 25 is a schematic diagram for explaining flow of magnetic flux in the automotive alternator according to Embodiment 10 of the present invention.
Figure 26:
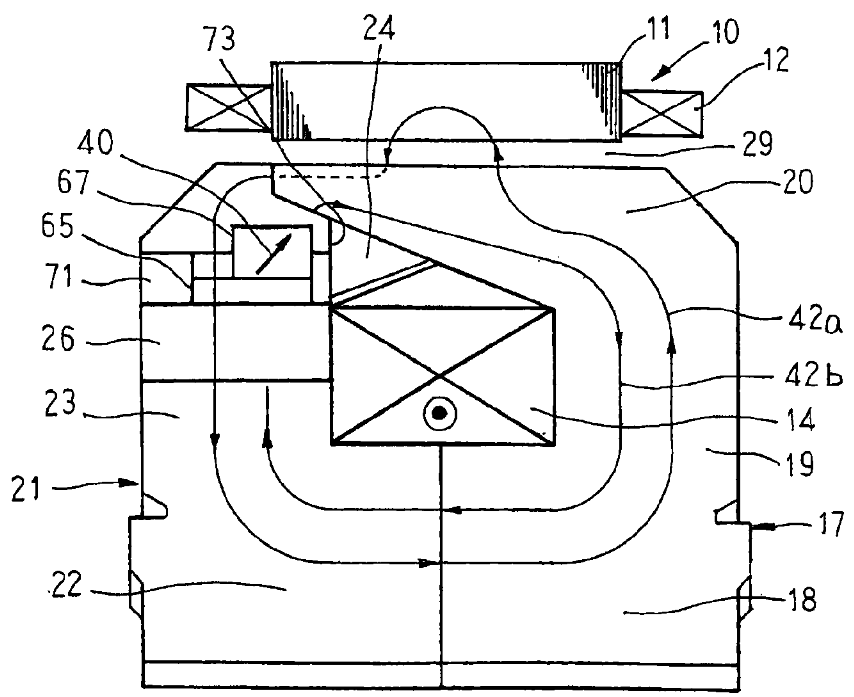
FIG. 26 is a schematic diagram for explaining flow of magnetic flux in the automotive alternator according to Embodiment 10 of the present invention.

Next, action of the magnetic flux will be explained with reference to FIGS. 25 and 26.

First, magnetic flux 42*a* is generated when an electric current is passed through the field coil 14. This magnetic flux 42*a* enters tooth portions of the stator core 11 by passing through the air gap 29 from the first claw-shaped magnetic pole portions 20. The magnetic flux 42*a* then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux 42*a* that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 10, the first and second permanent magnets 62 and 67 are magnetically oriented so as to be opposite to the orientation of the magnetic field 41 that is generated by the field coil 14. Thus, the orientation of the magnetic field that originates from the first and second permanent magnets 62 and 67 is in a reverse direction to the magnetic field 41 that is generated by the field coil 14. To interlink with the stator core 11, it is necessary for the magnetic flux 42*b* that originates from these first and second permanent magnets 62 and 67 to make a round trip across the air gap 29, which has a large magnetic resistance. The first and second permanent magnets 62 and 67 are disposed radially inside the second and first claw-shaped magnetic pole portions 24 and 20, and are disposed so as to circuit in a shorter magnetic path length than the inner circumferential surface sides of the first and second claw-shaped magnetic pole portions 20 and 24.

Because portions of the first and second permanent magnets 62 and 67 are exposed from the second and first claw-shaped magnetic pole portions 24 and 20 when viewed from radially outside, a portion of the magnetic flux 42*b* that originates from the second permanent magnets 67, for example, can easily flow through the stator core 11 from the portions that are exposed from the first claw-shaped magnetic pole portions 20. In Embodiment 10, because extensions of the directions of magnetization 40 that pass through the centers of the second permanent magnets 67 are oriented toward the inner circumferential surfaces near the tip ends of the facing first claw-shaped magnetic pole portions 20, the magnetic flux 42*b* flows toward the inner circumferential surfaces near the tip ends of the first claw-shaped magnetic pole portions 20 even at the portions that are exposed from the first claw-shaped magnetic pole portions 20, reducing the amount of magnetic flux that flows to the stator core 11. Thus, a large portion of the magnetic flux 42*b* forms a closed magnetic circuit inside the rotor without going around through the stator core 13D.

Specifically, magnetic flux 42*b* that originates from the first permanent magnets 62 enters the first magnetic guidance members 60. Here, the first trough portions 25, i.e., large air gaps, are present below the first magnetic guidance members 60. Thus, the magnetic flux 42*b* that has entered the first magnetic guidance members 60 flows through the first magnetic guidance members 60 in two circumferential directions and enters the first yoke portion 19, passes through the first boss portion 18, the second boss portion 22, the second yoke portion 23, and the second claw-shaped magnetic pole portions 24, and returns to the first permanent magnets 62 via the air gap. The magnetic flux 42*b* that originates from the second permanent magnets 67 enters the first claw-shaped magnetic pole portions 20 across the air gap, passes through the first yoke portion 19, the first boss portion 18, and the second boss portion 22, and enters the second yoke portion 23. The magnetic flux 42*b* that has entered the second yoke portion 23 flows radially outward through two sides of the second trough portions 26 of the second yoke portion 23, enters the second magnetic guidance members 65 from two ends of the second magnetic guidance members 65, and returns to the second permanent magnets 67.

Thus, the magnetic flux 42*b* that originates from the first and second permanent magnets 62 and 67 is in a reverse direction from the magnetic flux 42*a* that originates from the field coil 14, enabling the magnetic flux density of the magnetic bodies that constitute the first and second pole core bodies 17 and 21 to be reduced significantly, thereby enabling magnetic saturation to be relieved.

Figure 27:
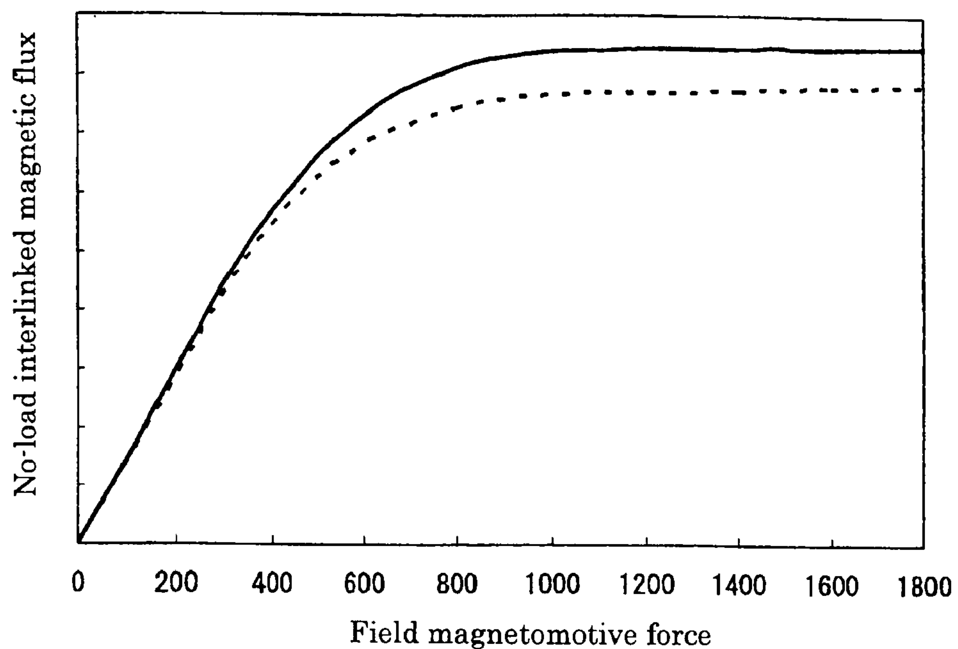
FIG. 27 is a graph that shows a relationship between field magnetomotive force and stator interlinked magnetic flux in the automotive alternator according to Embodiment 10 of the present invention.
Figure 28:
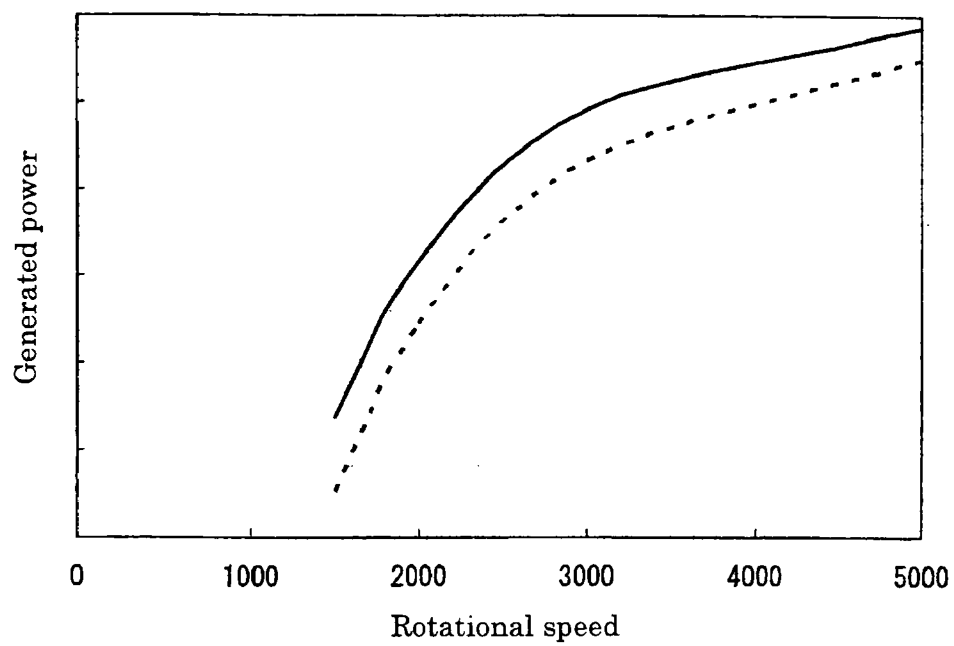
FIG. 28 is a graph that shows generated power relative to rotational frequency in the automotive alternator according to Embodiment 10 of the present invention.

Next, no-load stator interlinked magnetic flux relative to field magnetomotive force (field ampere turns) and generated power relative to rotational frequency (direct current A) were measured using an automotive alternator 100 that was configured in this manner, and the results are shown in FIGS. 27 and 28. For comparison, a conventional device from which the first and second permanent magnets 62 and 67 were omitted was prepared, no-load stator interlinked magnetic flux relative to field magnetomotive force and generated power relative to rotational frequency were measured, and the results are also shown in FIGS. 27 and 28. Moreover, in FIGS. 27 and 28, a solid line represents the present invention, and a broken line represents the conventional device.

It can be seen from FIG. 27 that the difference between the automotive alternator 100 and the conventional device is small in a region in which field magnetomotive force is small, and the difference between the automotive alternator 100 and the conventional device increases when a region in which magnetic saturation begins is exceeded. In other words, it can be seen that disposing the first and second permanent magnets 62 and 67 relieves magnetic saturation, thereby increasing the amount of magnetic flux that interlinks with the stator 10. Similarly, it can be seen from FIG. 28 that greater generated power can be obtained in the automotive alternator 100 than in the conventional device, particularly in a low rotational range.

In other words, in conventional devices, thirty percent or more of the magnetomotive force of the field is expended in the magnetic circuit of the rotor as a result of magnetic saturation, making it difficult to increase the amount of magnetic flux. In Embodiment 10, on the other hand, because magnetic saturation is relieved as described above, it can be inferred that the magnetic flux that interlinks with the stator 10 is increased, increasing generated power. In particular, it has been confirmed that generated power can be increased significantly in a low-speed idling region where magnetic saturation is pronounced.

In Embodiment 10, because first and second magnetic guidance members 60 and 65 are disposed so as to span over first and second trough portions 25 and 26, it is not necessary to fill the first and second trough portions 25 and 26 with the first and second magnetic guidance members 60 and 65, enabling the volume of the first and second magnetic guidance members 60 and 65 to be reduced. In addition, because first and second permanent magnets 62 and 67 are held by the first and second magnetic guidance members 60 and 65 that are disposed so as to span over the first and second trough portions 25 and 26, the first and second permanent magnets 62 and 67 can be a minimum required size. Thus, centrifugal forces that act on the first and second magnetic guidance members 60 and 65 and the first and second permanent magnets 62 and 67 during high-speed rotation are reduced, and the effects of displacement of the first and second claw-shaped magnetic pole portions 20 and 24 that result from the centrifugal forces and thermal expansion are also eliminated. The first and second permanent magnets 62 and 67 can thereby be held in the pole core 15 stably using a simple holding construction.

Because the first and second magnetic guidance members 60 and 65 link radially outer portions of inner wall surfaces of the first and second trough portions 25 and 26 circumferentially, occurrences of deformation of the pole core 15 can be suppressed.

Because the first and second magnetic guidance members 60 and 65 are prepared as separate parts from the first and second pole core bodies 17 and 21, milling precision is easily ensured, interfitting surfaces of the first and second holding grooves 70 and 71 and interfitting surfaces of the first and second permanent magnets 62 and 67 can be prepared with high precision. Thus, because gaps at interfitting portions between the first and second magnetic guidance members 60 and 65 and the first and second yoke portions 19 and 23, and also gaps at interfitting portions between the first and second magnetic guidance members 60 and 65 and the first and second permanent magnets 62 and 67, can kept to a minimum, reducing magnetic resistance at these interfitting portions, the amount of magnetic flux from the magnets is increased, enabling the magnets to be used effectively.

Because the first and second permanent magnets 62 and 67 are positioned radially inside outermost circumferential surfaces of the rotor 13D, stator slot harmonics are confined to outermost circumferential surface portions of the first and second claw-shaped magnetic pole portions 20 and 24, and do not act to heat the first and second permanent magnets 62 and 67 by induction directly. As a result, the first and second permanent magnets 62 and 67 are prevented from being heated and thermally demagnetized.

Extensions of the directions of magnetization 40 that pass through the centers of the first and second permanent magnets 62 and 67 are oriented toward inner circumferential surfaces near tip ends of facing second and first claw-shaped magnetic pole portions 24 and 20. Thus, the magnetic circuits of the first and second permanent magnets 62 and 67 are closed magnetic circuits inside the rotor, reducing magnetic flux components that interact with the stator 10. Thus, the occurrence of voltages induced by the first and second permanent magnets 62 and 67 during no-load de-energization is suppressed. Even if the amount of exposure of the first and second permanent magnets 62 and 67 from the second and first claw-shaped magnetic pole portions 24 and 20 when viewed from a radial direction is increased, increases in magnetic flux components that interact with the stator 10 can be suppressed. As a result of the above, the magnet volume of the first and second permanent magnets 62 and 67 can be increased.

Because the first and second permanent magnets 62 and 67 are held in the first and second magnetic guidance members 60 and 65 so as to be offset axially, portions of the first and second permanent magnets 62 and 67 that face the inner circumferential surfaces near the tip ends of the second and first claw-shaped magnetic pole portions 24 and 20 can be increased. As a result, leakage of magnetic flux 42*b* that originates from the first and second permanent magnets 62 and 67 can be reduced.

Because the first and second magnetic guidance members 60 and 65 are prepared so as to be thicker than the thickness of the first and second permanent magnets 62 and 67, interfitting surface area between the first and second magnetic guidance members 60 and 65 and the first and second holding grooves 70 and 71 can be increased. As a result, holding strength on the first and second magnetic guidance members 60 and 65 by the first and second yoke portions 19 and 23 is increased, enabling the first and second permanent magnets 62 and 67 to be held stably even if the centrifugal forces act on the first and second permanent magnets 62 and 67 and the first and second magnetic guidance members 60 and 65.

Now, the first and second bending lines 72 and 73 are formed on boundaries between the first and second yoke portions 19 and 23 and the first and second claw-shaped magnetic pole portions 20 and 24. The circumferential widths of the first and second claw-shaped magnetic pole portions 20 and 24 are gradually reduced toward the tip end portions from the bending lines 72 and 73. Thus, if the first and second holding grooves 70 and 71 are formed axially outside the first and second bending lines 72 and 73, the further outside the bending lines 72 and 73 the smaller the interfitting surface area between the first and second holding grooves 70 and 71 and the first and second magnetic guidance members 60 and 65. Because of this, it is preferable not to form the first and second holding grooves 70 and 71 axially outside the first and second bending lines 72 and 73. Alternatively, if the first and second holding grooves 70 and 71 are formed so as to pass through axially, it is preferable to fit the first and second magnetic guidance members 60 and 65 into the first and second holding grooves 70 and 71 so as not to be positioned on a field coil 14 side of the bending lines 72 and 73.

Thus, it is preferable for the first and second magnetic guidance members 60 and 65 to be fitted into and held by the first and second holding grooves 70 and 71 so as to be positioned between points of intersection O between the first and second holding grooves 70 and 71 and the first and second bending lines 72 and 73, and axial outer end surfaces of the first and second yoke portions 19 and 23.

Moreover, the first and second permanent magnets 62 and 67 are formed so as to have trapezoidal cross sections that have a predetermined thickness, but the first and second permanent magnets 62 and 67 are not limited to a particular cross-sectional shape provided that they can be fitted into and held by the first and second magnetic guidance members 60 and 65. Similarly, the first and second magnetic guidance members 60 and 65 are formed so as to have trapezoidal cross sections that have a predetermined thickness, but the first and second magnetic guidance members 60 and 65 are not limited to a particular cross-sectional shape provided that they can be fitted into and held by the first and second holding grooves 70 and 71. In other words, groove shapes of the interfitting grooves and the holding grooves can be set arbitrarily to match the shapes of the permanent magnets and the interfitting portions of the magnetic guidance members.

Cross sections of the first and second permanent magnets 62 and 67 in planes that include the central axis of the rotor 13D are formed so as to have a rectangular shape, but that cross-sectional shape can also be set arbitrarily.

Embodiment 11

Embodiment 11 is configured in a similar manner to Embodiment 10 above except that bending lines are formed at boundaries between claw-shaped magnetic pole portions and yoke portions so as to be inclined so as to have gradients that descend toward a field coil 14. Moreover, because first and second permanent magnets 62 and 67 are held in a similar manner by first and second pole core bodies 17 and 21, only a holding construction for the second permanent magnets 67 will be explained here, and explanation of a holding construction for the first permanent magnets 62 will be omitted.

Figure 29:
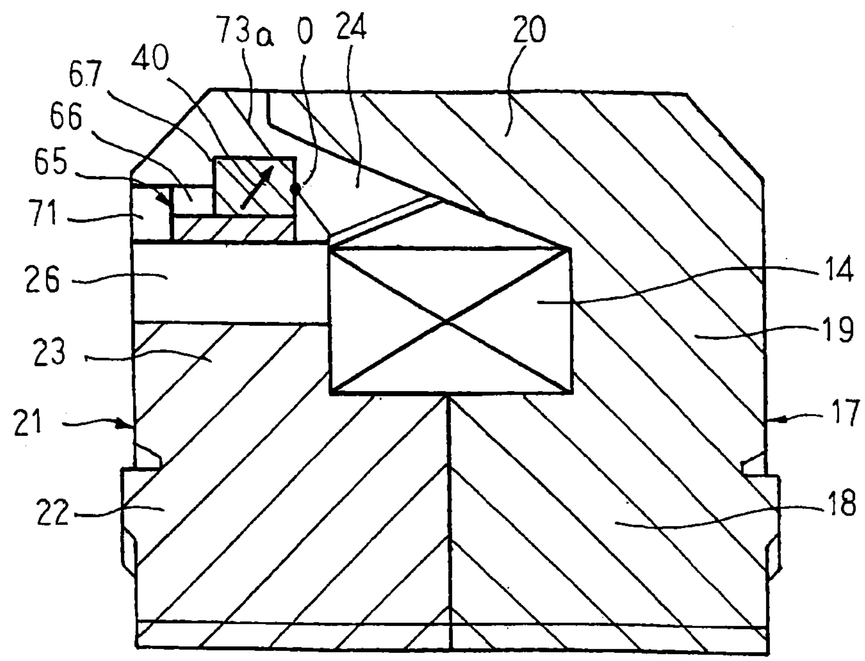
FIG. 29 is a cross section that shows part of a rotor that can be used in an automotive alternator according to Embodiment 11 of the present invention.

FIG. 29 is a cross section that shows part of a rotor that can be used in an automotive alternator according to Embodiment 11 of the present invention.

In FIG. 29, second bending lines 73*a* are formed at boundaries between second claw-shaped magnetic pole portions 24 and a second yoke portion 23 so as to be inclined so as to have gradients that descend toward the field coil 14.

Second holding grooves 71 are recessed so as to reach from a second end toward a first end portion of the second yoke portion 23 to the second bending lines 73 near roots of respective second claw-shaped magnetic pole portions 24 of the second pole core body 21 so as to have openings at respective facing portions radially outside inner walls surfaces of respective second trough portions 26 and so as to have groove directions in the axial direction. Second magnetic guidance members 65 are mounted to the second pole core body 21 by being press-fitted into the facing second holding grooves 71 from axially outside with the second permanent magnets 67 oriented upward so as to be magnetically connected when disposed so as to span each of the second trough portions 26, adhesive being applied if required.

Here, thickness directions of the second magnetic guidance members 65 and the second permanent magnets 67 are oriented in the axial direction. The second permanent magnets 67 are held in the second magnetic guidance members 65 such that centers thereof are shifted toward the field coil 14 relative to centers of the second magnetic guidance members 65 in the thickness direction, that is, offset axially toward the field coil 14. Ends of the second permanent magnets 67 near the field coil 14 overlap with the first claw-shaped magnetic pole portions 20 in the axial direction, and opposite ends of the second permanent magnets 67 from the field coil 14 do not overlap with the first claw-shaped magnetic pole portions 20. When viewed from radially outside, portions of the second permanent magnets 67 are exposed from the first claw-shaped magnetic pole portions 20, and remaining portions are positioned at an inside diameter portion of the first claw-shaped magnetic pole portions 20, and upper surfaces thereof face inner circumferential surfaces near the tip ends of the first claw-shaped magnetic pole portions 20 so as to leave a predetermined clearance.

The second permanent magnets 67 are magnetically oriented such that directions of magnetization 40 are inclined so as to have gradients that ascend toward the field coil 14 in planes that include the central axis of the rotor 13D and that pass through the centers of the second permanent magnets 67. Extensions of the directions of magnetization 40 that pass through the centers of the second permanent magnets 67 are oriented toward the inner circumferential surfaces near the tip ends of the facing first claw-shaped magnetic pole portions 20.

Consequently, in Embodiment 11, effects can also be achieved in a similar manner to Embodiment 10.

Now, if the second holding grooves 71 are formed axially outside the second bending lines 73*a*, the further outside the second bending lines 73*a* the smaller the interfitting surface area between the second holding grooves 71 and the second magnetic guidance members 65. Because of this, it is preferable not to form the second holding grooves 71 axially outside second bending lines 73*a*. Alternatively, if the second holding grooves 71 are formed so as to pass through axially, it is preferable to fit the second magnetic guidance members 65 into the second holding grooves 71 so as not to be positioned on a field coil 14 side of the second bending lines 73*a*.

Thus, in Embodiment 11, it is also preferable for the second magnetic guidance members 65 to be fitted into and held in the second holding grooves 71 so as to be positioned between points of intersection O between the second holding grooves 71 and second bending lines 73*a*, and axial outer end surfaces of the first and second yoke portions 19 and 23.

Embodiment 12

Embodiment 12 is configured in a similar manner to Embodiment 10 above except that permanent magnets are used in which a direction of magnetization is perpendicular to a lower surface of the permanent magnet. Moreover, because first and second permanent magnets 62 and 67 are held in a similar manner by first and second pole core bodies 17 and 21, only a holding construction for the second permanent magnets 67 will be explained here, and explanation of a holding construction for the first permanent magnets 62 will be omitted.

Figure 30:
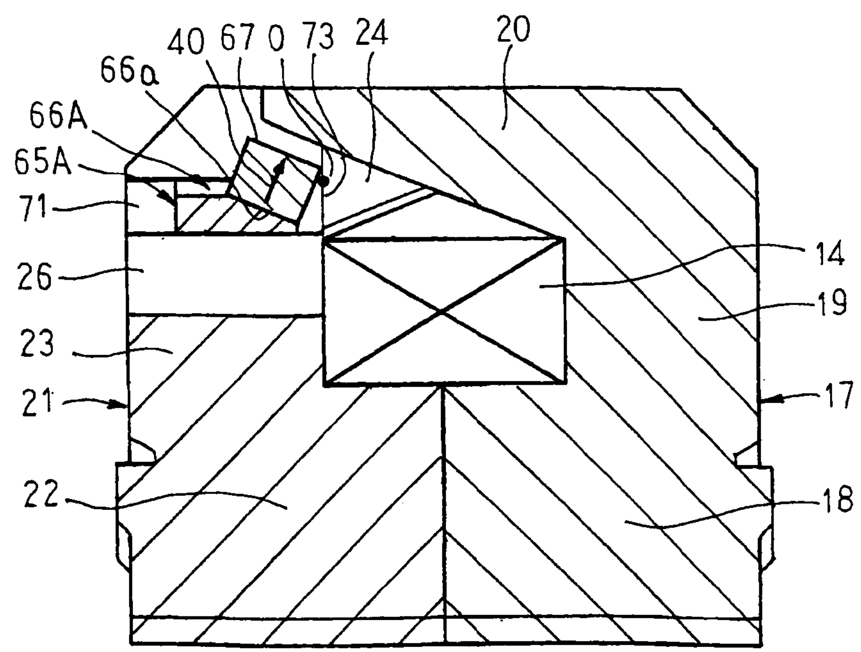
FIG. 30 is a cross section that shows part of a rotor that can be used in an automotive alternator according to Embodiment 12 of the present invention.

FIG. 30 is a cross section that shows part of a rotor that can be used in an automotive alternator according to Embodiment 12 of the present invention.

In FIG. 30, second magnetic guidance members 65A are prepared so as to have trapezoidal cross sections that have a predetermined thickness using a magnetic material such as iron, or a ferromagnetic alloy, etc. Second interfitting grooves 66A that have groove directions in a thickness direction of the second magnetic guidance members 65A are recessed into upper surfaces of the second magnetic guidance members 65A so as to have openings. Here, upper and lower surfaces of the second magnetic guidance members 65A are mutually parallel flat surfaces. Bottom surfaces 66*a* in regions of first end portions of the second interfitting grooves 66A are formed so as to have inclined surfaces that have gradients that descend toward first ends of the second magnetic guidance members 65A. The second interfitting grooves 66A are formed so as to have wedge shapes in which groove widths become gradually narrower toward the openings.

The second permanent magnets 67 are fitted into the second interfitting grooves 66A such that their thickness directions are oriented in the thickness direction of the second magnetic guidance members 65A, and first end edge portions of the lower surfaces of the second permanent magnets 67 are aligned with first end edge portions of bottom surfaces of the second interfitting grooves 66A, and are held in the second magnetic guidance members 65A by applying an adhesive if required. Thus, the bottom surfaces 66*a* of the second interfitting grooves 66A and the lower surfaces of the second permanent magnets 67 face each other in close contact or so as to have minute gaps, and the second magnetic guidance members 65A and the second permanent magnets 67 are connected magnetically. The directions of magnetization 40 of the second permanent magnets 67 are perpendicular to the lower surfaces of the second permanent magnets 67.

The second magnetic guidance members 65A are fitted into the second holding grooves 71 such that first end portions are oriented toward the field coil 14. Here, the bottom surfaces 66*a* of the second interfitting grooves 66A and the lower surfaces of the second permanent magnets 67 are flat surfaces that are tangential to a truncated conical surface that is coaxial with the rotor 13D. These flat surfaces are inclined surfaces that have gradients that are inclined in the axial direction relative to the rotating shaft 16 in directions toward the field coil 14 radially inward from a radially outer position, i.e., gradients that descend toward the field coil 14. Because the directions of magnetization 40 of the second permanent magnets 67 are perpendicular to the lower surfaces of the second permanent magnets 67, extensions of the directions of magnetization 40 that pass through the centers of the second permanent magnets 67 are oriented toward the inner circumferential surfaces near the tip ends of the facing first claw-shaped magnetic pole portions 20. First end edge portions of the upper surfaces of the second permanent magnets 67 are aligned with the second bending lines 73.

Consequently, in Embodiment 12, effects can also be achieved in a similar manner to Embodiment 10.

According to Embodiment 12, because the bottom surfaces 66*a* of the second interfitting grooves 66A are formed into inclined surfaces that have gradients that descend toward the field coil 14, the directions of magnetization 40 are perpendicular to the lower surfaces of the second permanent magnets 67, and extensions of the directions of magnetization 40 are directed toward the inner circumferential surfaces near the tip ends of the facing first claw-shaped magnetic pole portions 20. Thus, it is not necessary to incline the directions of magnetization relative to the lower surfaces of the second permanent magnets 67, facilitating magnetizing of the second permanent magnets 67. Gaps between the second permanent magnets 67 and the first claw-shaped magnetic pole portions 20 also become narrower, increasing the amount of magnetic flux from the second permanent magnets 67, thereby increasing output.

Here in Embodiment 12, it is also preferable for the second magnetic guidance members 65A to be fitted into and held in the second holding grooves 71 so as to be positioned between points of intersection O between the second holding grooves 71 and second bending lines 73 and axial outer end surfaces of the first and second yoke portions 19 and 23. Because first end portions of the second permanent magnets 67 enter an inside diameter portion of the first claw-shaped magnetic pole portions 20 beyond the second bending lines 73 if the second magnetic guidance members 65A are fitted into the second holding grooves 71 such that first ends thereof are aligned with the points of intersection O, the leak rate of the magnetic flux that originates from the second permanent magnets 67 can be reduced greatly.

The bottom surfaces 66*a* in regions at the first end portions of the second interfitting grooves 66A are made into inclined surfaces, but bottom surfaces of the whole interfitting groove may also be made into inclined surfaces.

Embodiment 13

Figure 31:
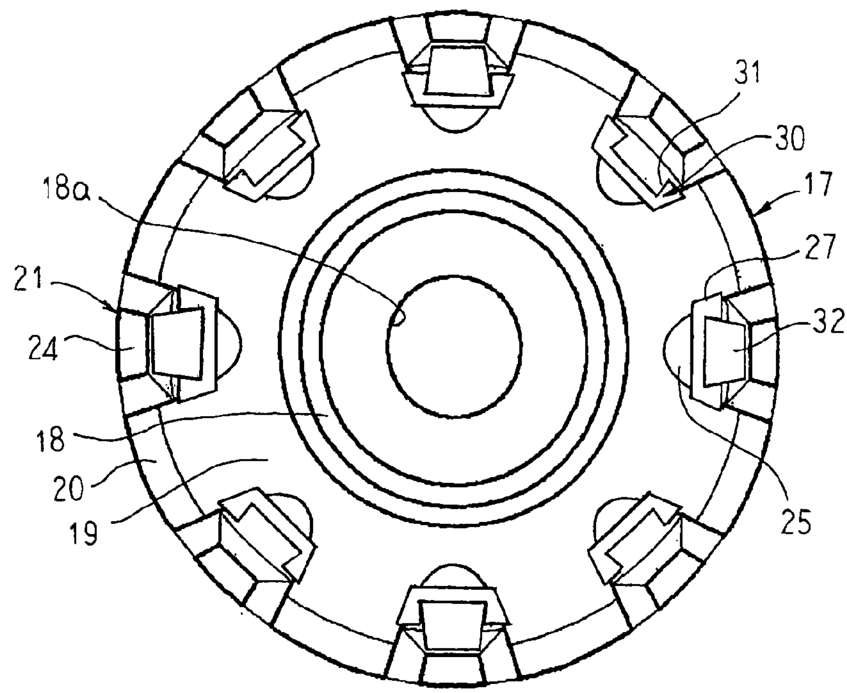
FIG. 31 is an end elevation that shows a rotor that can be used in an automotive alternator according to Embodiment 13 of the present invention.

FIG. 31 is an end elevation that shows a rotor that can be used in an automotive alternator according to Embodiment 13 of the present invention.

In FIG. 31, first magnetic guidance members 30 are respectively disposed so as to span eight first trough portions 25. First permanent magnets 32 are fitted together with and held by only first interfitting grooves 31 in circumferentially alternate first magnetic guidance members 30. Here, although not shown, second magnetic guidance members 35 are also respectively disposed so as to span eight second trough portions 26 in a second pole core body 21, and second permanent magnets 37 are fitted together with and held by only second interfitting grooves 36 in circumferentially alternate second magnetic guidance members 35.

Moreover, the rest of the configuration is configured in a similar manner to Embodiment 1 above.

In Embodiment 13, first magnetic guidance members 30 are disposed so as to span each of the first trough portions 25, and first permanent magnets 32 are held in circumferentially alternate first magnetic guidance members 30. Similarly, second magnetic guidance members 35 are disposed so as to span each of the second trough portions 26, and second permanent magnets 37 are held in circumferentially alternate second magnetic guidance members 35. Consequently, superior reliability can be ensured without generating gravimetric imbalances relative to centrifugal forces, and although output is reduced slightly compared to when permanent magnets are disposed in all of the trough portions, the number of parts can be reduced, and output can be increased using an inexpensive configuration.

Embodiment 14

Figure 32:
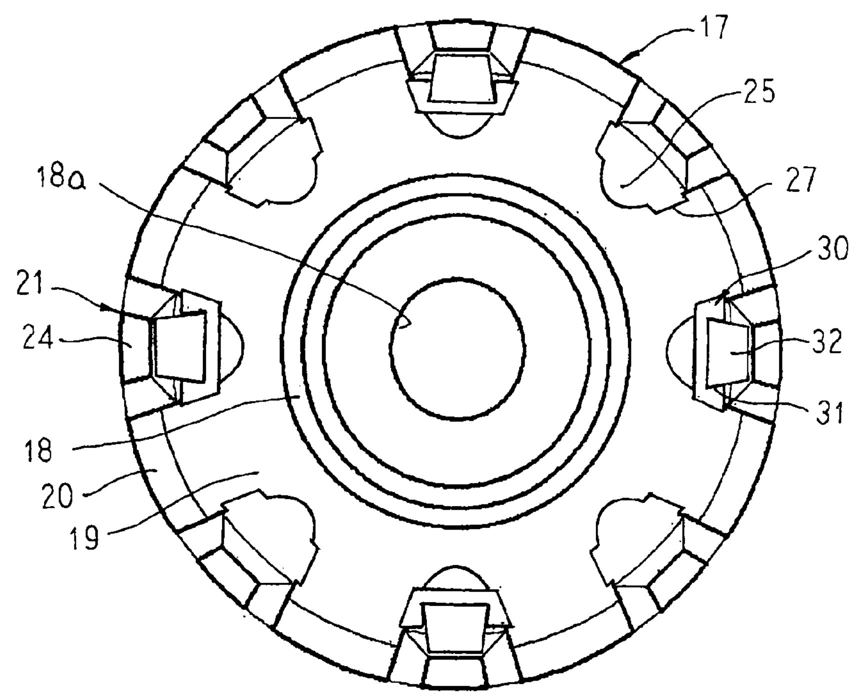
FIG. 32 is an end elevation that shows a rotor that can be used in an automotive alternator according to Embodiment 14 of the present invention.

FIG. 32 is an end elevation that shows a rotor that can be used in an automotive alternator according to Embodiment 14 of the present invention.

In FIG. 32, first magnetic guidance members 30 are disposed so as to span circumferentially alternate first trough portions 25. First permanent magnets 32 are fitted together with and held by first interfitting grooves 31 in each of the first magnetic guidance members 30. Here, although not shown, second magnetic guidance members 35 are respectively disposed so as to span circumferentially alternate second trough portions 26 in a second pole core body 21, and second permanent magnets 37 are fitted together with and held by second interfitting grooves 36 in each of the second magnetic guidance members 35.

Moreover, the rest of the configuration is configured in a similar manner to Embodiment 1 above.

In Embodiment 14, first magnetic guidance members 30 are disposed so as to span circumferentially alternate first trough portions 25, and first permanent magnets 32 are held in each of the first magnetic guidance members 30. Similarly, second magnetic guidance members 35 are disposed so as to span circumferentially alternate second trough portions 26, and second permanent magnets 37 are held in each of the second magnetic guidance members 35. Consequently, superior reliability can be ensured without generating gravimetric imbalances relative to centrifugal forces, and although output is reduced slightly compared to when permanent magnets are disposed in all of the trough portions, the number of parts can be reduced, and output can be increased using an inexpensive configuration.

Now, in Embodiments 13 and 14 above, permanent magnets are held in magnetic guidance members that are disposed so as to span circumferentially alternate trough portions of each of the pole core bodies, but permanent magnets may also be held in all of the magnetic guidance members that are disposed so as to span each of the trough portions in a first pole core body, and no permanent magnets held in the magnetic guidance members that are disposed so as to span each of the trough portions in a second pole core body. In that case, although output is also reduced slightly compared to when permanent magnets are disposed in each of the magnetic guidance members that are disposed so as to span all of the trough portions, the number of parts can be reduced, enabling output to be increased using an inexpensive configuration. Because the permanent magnets are disposed in a well-balanced manner circumferentially, gravimetric imbalances do not arise relative to centrifugal forces.

In Embodiments 1 through 12 above, sixteen permanent magnets have been explained as being disposed, and in Embodiments 13 and 14 above, eight permanent magnets have been explained as being disposed, but the number of permanent magnets disposed need only be set appropriately to match required output. In that case, it is preferable to dispose the permanent magnets in a well-balanced manner circumferentially so as not to generate gravimetric imbalances with respect to centrifugal forces.

Moreover, in each of the above embodiments, explanations are given for automotive alternators, but the present invention is not limited to automotive alternators, and similar effects are also exhibited if the present invention is applied to dynamoelectric machines such as automotive electric motors, automotive generator-motors, etc.

In each of the above embodiments, the first and second magnetic guidance members and the first and second permanent magnets are formed so as to have trapezoidal cross-sectional shapes perpendicular to the central axis of the shaft, but the cross-sectional shapes are not limited to trapezoidal shapes, and for example may also be quadrilaterals of square or rectangular shape. Moreover, it goes without saying that chamfering or rounding may also be applied to corner portions of the quadrilateral cross sections.

What is claimed is:

1. A dynamoelectric machine comprising:

a rotor comprising:

a pole core comprising:

a boss portion;

a pair of yoke portions that are disposed so as to extend radially outward from two axial end edge portions of said boss portion; and a plurality of claw-shaped magnetic pole portions that are disposed so as to extend in an axial direction alternately from each of said pair of yoke portions, and that are arranged circumferentially so as to intermesh with each other, a trough portion that curves radially inward being formed on a portion of each of said yoke portions between circumferentially adjacent claw-shaped magnetic pole portions, and said pole core being prepared such that tip end portions of said claw-shaped magnetic pole portions overlap with said yoke portions axially, and being fixed to a rotating shaft that is inserted through a central axial position of said boss portion; and a field coil that is housed inside a space that is surrounded by said boss portion, said pair of yoke portions, and said plurality of claw-shaped magnetic pole portions; and a stator that is disposed so as to surround an outer circumference of said rotor so as to have a predetermined air gap interposed, said dynamoelectric machine comprising:

a magnetic guidance member that is made of a magnetic material and is disposed so as to span said trough portion by being connected to each of consecutive yoke portions at locations above a bottom of said trough; and a permanent magnet that is disposed on said magnetic guidance member so as to face an inner circumferential surface near a tip end of said claw-shaped magnetic pole portions so as to have a predetermined clearance, and that is magnetically oriented in a reverse direction to an orientation of a magnetic field produced by said field coil.

2. The dynamoelectric machine according to claim 1, wherein a direction of magnetization of said permanent magnet is approximately perpendicular to said inner circumferential surface near said tip end of said facing claw-shaped magnetic pole portion.

3. The dynamoelectric machine according to claim 1, wherein an outer circumferential surface of said permanent magnet is approximately parallel to said inner circumferential surface near said tip end of said facing claw-shaped magnetic pole portion.

4. The dynamoelectric machine according to claim 3, wherein an inner circumferential surface and an outer circumferential surface of said permanent magnet are parallel.

5. The dynamoelectric machine according to claim 1, wherein: holding grooves are recessed near roots of said claw-shaped magnetic pole portions of said pole core from radially outside said yoke portions toward said field coil so as to have openings at respective facing portions radially outside an inner wall surface of said trough portion, and so as to have a groove direction oriented axially; an interfitting groove is recessed into said magnetic guidance member so as to have an opening in a direction that is positioned radially outside said magnetic guidance member that is fitted into and held by said holding grooves, and so as to have a groove direction oriented axially; said magnetic guidance member is disposed so as to span said trough portion by being fitted into and held by said facing holding grooves; said permanent magnet is held by said magnetic guidance member by being fitted into said interfitting groove; and said permanent magnet is positioned entirely in an inside diameter portion of said claw-shaped magnetic pole portions when viewed from radially outside.

6. The dynamoelectric machine according to claim 1, wherein: holding grooves are recessed near roots of said claw-shaped magnetic pole portions of said pole core from radially outside said yoke portions toward said field coil so as to have openings at respective facing portions radially outside an inner wall surface of said trough portion, and so as to have a groove direction oriented axially; an interfitting groove is recessed into said magnetic guidance member so as to have an opening in a direction that is positioned radially outside said magnetic guidance member that is fitted into and held by said holding grooves, and so as to have a groove direction oriented axially; said magnetic guidance member is disposed so as to span said trough portion by being fitted into and held by said facing holding grooves; said permanent magnet is prepared so as to have an axial length that is shorter than said magnetic guidance member, and is held by said magnetic guidance member by being fitted into said interfitting groove such that a center of said permanent magnet is offset closer to said field coil than a center of said magnetic guidance member in the axial direction; and a portion of said permanent magnet is exposed from said claw-shaped magnetic pole portions when viewed from radially outside, and a remaining portion is positioned in an inside diameter portion of said claw-shaped magnetic pole portions, and said permanent magnet is magnetically oriented such that an extension of a direction of magnetization that passes through said center of said permanent magnet is directed at said inner circumferential surface near said tip end of said claw-shaped magnetic pole portion.

7. The dynamoelectric machine according to claim 6, wherein at least a region near said field coil in an axial position of said interfitting groove is formed so as to have a groove shape that has a gradient that is inclined relative to said rotating shaft in a direction that is radially inward from a radially outer position toward said field coil, and said permanent magnet is held by said magnetic guidance member by being fitted into said region of said interfitting groove that is inclined at said gradient.

8. The dynamoelectric machine according to claim 6, wherein: bending lines are formed on said pole core at boundaries between said claw-shaped magnetic pole portions and said yoke portions; and said magnetic guidance member is fitted into and held by said holding grooves so as to be positioned between a point of intersection between said holding grooves and said bending lines, and an axially outer end surface of said yoke portions.

9. The dynamoelectric machine according to claim 1, wherein said permanent magnet is covered by a protective cover.

10. The dynamoelectric machine according to claim 1, wherein said permanent magnet is molded in a resin.

11. The dynamoelectric machine according to claim 1, wherein an air gap exists between a bottom surface of the magnetic guidance member and the bottom of the trough.

12. The dynamoelectric machine according to claim 1, wherein the magnetic guidance member extends into an aperture in each consecutive yoke portion to which the magnetic guidance member is attached.

* * * * *